CHARACTER RECOGNITION SYSTEM INCLUDING CIRCUITS FOR LOCATING CHARACTERS AND CIRCUITS FOR DISCRIMINATING AGAINST NOISE

Filed June 6, 1962 12 Sheets-Sheet 1

INVENTOR.
SEYMOUR KLEIN
BY Samuel Cohen
ATTORNEY

INVENTOR.
SEYMOUR KLEIN
BY Samuel Cohen
ATTORNEY

Sept. 20, 1966 S. KLEIN 3,274,550

CHARACTER RECOGNITION SYSTEM INCLUDING CIRCUITS FOR LOCATING CHARACTERS AND CIRCUITS FOR DISCRIMINATING AGAINST NOISE

Filed June 6, 1962 12 Sheets-Sheet 3

INVENTOR.
SEYMOUR KLEIN
BY Samuel Cohen
ATTORNEY

Sept. 20, 1966 S. KLEIN 3,274,550

CHARACTER RECOGNITION SYSTEM INCLUDING CIRCUITS FOR LOCATING CHARACTERS AND CIRCUITS FOR DISCRIMINATING AGAINST NOISE

Filed June 6, 1962 12 Sheets-Sheet 4

INVENTOR.
SEYMOUR KLEIN
BY Samuel Cohen
ATTORNEY

CHARACTER RECOGNITION SYSTEM INCLUDING CIRCUITS FOR LOCATING CHARACTERS AND CIRCUITS FOR DISCRIMINATING AGAINST NOISE

Filed June 6, 1962 12 Sheets-Sheet 5

INVENTOR.
SEYMOUR KLEIN
BY Samuel Cohen
ATTORNEY

INVENTOR.
SEYMOUR KLEIN
BY Samuel Cohen
ATTORNEY

Sept. 20, 1966 S. KLEIN 3,274,550

CHARACTER RECOGNITION SYSTEM INCLUDING CIRCUITS FOR LOCATING CHARACTERS AND CIRCUITS FOR DISCRIMINATING AGAINST NOISE

Filed June 6, 1962 12 Sheets-Sheet 7

INVENTOR.
SEYMOUR KLEIN
BY Samuel Cohen
ATTORNEY

INVENTOR.
SEYMOUR KLEIN
BY Samuel Cohen
ATTORNEY

Sept. 20, 1966 S. KLEIN 3,274,550

CHARACTER RECOGNITION SYSTEM INCLUDING CIRCUITS FOR LOCATING CHARACTERS AND CIRCUITS FOR DISCRIMINATING AGAINST NOISE

Filed June 6, 1962 12 Sheets-Sheet 9

INVENTOR.
SEYMOUR KLEIN
BY Samuel Cohen
ATTORNEY

CHARACTER RECOGNITION SYSTEM INCLUDING CIRCUITS FOR LOCATING CHARACTERS AND CIRCUITS FOR DISCRIMINATING AGAINST NOISE

Filed June 6, 1962 12 Sheets-Sheet 10

INVENTOR.
SEYMOUR KLEIN
BY Samuel Cohen
ATTORNEY

Sept. 20, 1966 S. KLEIN 3,274,550

CHARACTER RECOGNITION SYSTEM INCLUDING CIRCUITS FOR LOCATING CHARACTERS AND CIRCUITS FOR DISCRIMINATING AGAINST NOISE

Filed June 6, 1962 12 Sheets-Sheet 11

INVENTOR.
SEYMOUR KLEIN
BY Samuel Cohen
ATTORNEY

Sept. 20, 1966 S. KLEIN 3,274,550

CHARACTER RECOGNITION SYSTEM INCLUDING CIRCUITS FOR LOCATING CHARACTERS AND CIRCUITS FOR DISCRIMINATING AGAINST NOISE

Filed June 6, 1962 12 Sheets-Sheet 12

INVENTOR.
SEYMOUR KLEIN
BY Samuel Cohen
ATTORNEY

United States Patent Office
3,274,550
Patented Sept. 20, 1966

3,274,550

CHARACTER RECOGNITION SYSTEM INCLUDING CIRCUITS FOR LOCATING CHARACTERS AND CIRCUITS FOR DISCRIMINATING AGAINST NOISE

Seymour Klein, Philadelphia, Pa., assignor to Radio Corporation of America, a corporation of Delaware Filed June 6, 1962, Ser. No. 200,365
9 Claims. (Cl. 340—146.3)

This invention relates generally to character recognition. More particularly, the invention relates to circuits in an automatic reading machine for locating and centering characters being read.

*Introduction*

There are many applications in which alpha-numeric or other characters must be translated into a digital code. The translation can be performed by a human operator but only at a relatively low speed—the speed at which a "code typer" or similar machine can be operated. More accurate translation at much higher speed can be achieved with modern reading machines—machines which automatically recognize characters and translate them into digital code. One class of such machines employs mask matching techniques to recognize the characters. This involves superimposing an image of a character over masks of many different characters, and measuring the amount of light which passes through the masks.

The mask matching process requires accurate registration of the unknown characters with the masks of the characters. In some systems, for example, the accuracy required is from one to two percent of the absolute width of a character. This means that the locations of the lines of print to be read and of the characters in each line must be precise and must be known before a "correlation" can be made. Unfortunately, in most documents these locations are not known to the precision required. One reason is that typewriters, electromechanical printers and other means used to print the documents are not engineered to such close tolerances. The printed characters often appear higher or lower or to the left or the right of the position at which they should appear in the line. And the lines themselves are often not spaced precisely the same distances from one another.

*Objects*

An object of the present invention is to provide an improved automatic reading machine.

Another object of the invention is to provide circuits in a character recognition system which automatically locate and center each character on a page. More precisely, the object is to provide a system which locates the characters and then positions the readout means with respect to the characters in a desired relative relationship.

*Brief description of invention*

In the system of the present invention, a moving spot of light, such as one generated by a flying spot scanner, is employed to locate the characters and to center the readout means with respect to the characters. The spot of light first locates the position of a line by locating, for example, the character which extends furthest above the line. It then locates two edges of each character in the line, these two edges being tangent respectively to mutually perpendicular scan lines. Thereafter, the characters are read out using these edges as references.

In a preferred form of the invention, each character is read out by scanning the character with a television raster type scan. The light reflected from a character is picked up by light responsive means such as photomultiplier means, and the image of the character is displayed on a kinescope. The displayed character is compared with masks of all characters to identify the character and to thereafter obtain a digital output indicative of the character.

*Brief description of drawings*

Similar reference numerals are applied to similar circuit elements throughout the figures.

*General*

A number of blocks shown in the figures represent known circuits. The circuits of the blocks are actuated by electrical signals applied to the blocks. In the case of logic circuits, when a signal is at one level, it represents the binary digit "one" and when it is at another level, it represents the binary digit "zero." For the sake of the discussion which follows, it may be assumed that a high level signal represents the binary digit "one" and a low level signal the binary digit "zero." Also, to simplify the discussion, rather than speaking of an electrical signal being applied to a logic block or stage, it is sometimes stated that a "one" or a "zero" is applied to a logic block or stage.

In some of the figures capital letters are used to represent signals indicative of binary digits. For example, A may represent the binary digit "zero" or the binary digit "one." $\bar{A}$ represents the complement of A.

A number of elementary logic circuits are present in the various figures. The symbols which are employed and their Boolean equations are shown in FIGS. 1*a*–1*d*.

In illustrating the invention, only those circuits necessary to an understanding of the principles of operation of the invention are shown. Engineering details such as impedance matching circuits, stages of amplification, power supplies and so on are often omitted in the interest of simplifying the explanation.

*Character recognition system*

Figures 1A, 1B, 1C, 1D:
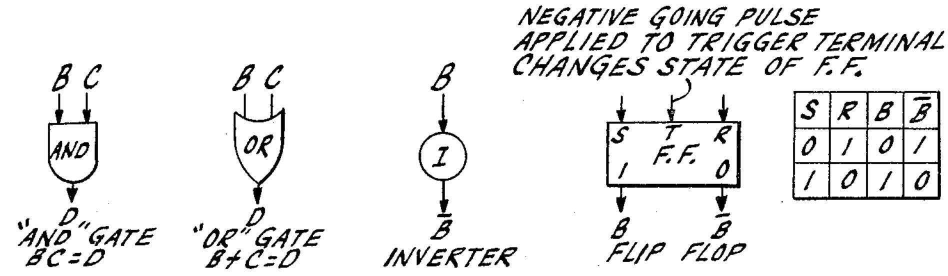
FIGS. 1*a*–1*d* are diagrams to explain the symbols employed in the following figures.
Figure 2:
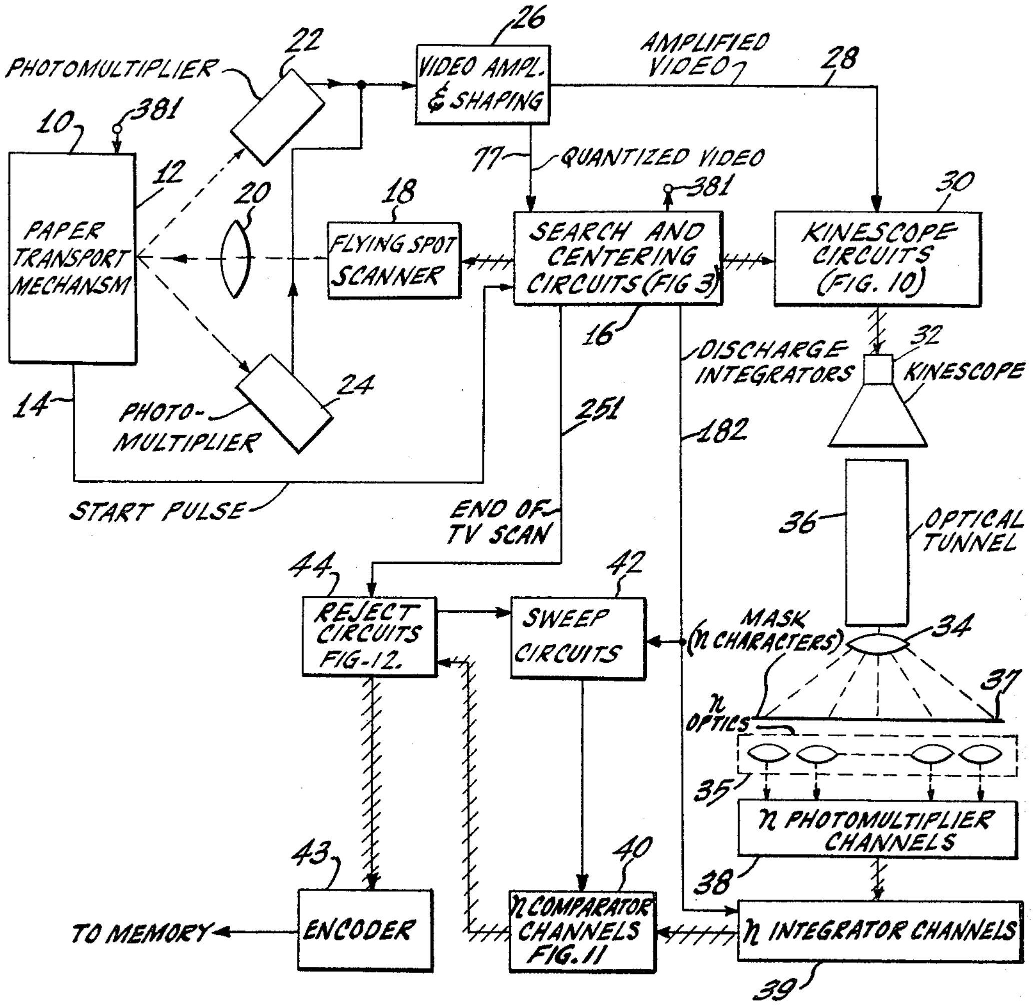
FIG. 2 is a block circuit diagram of a character recognition system according to the invention.

The system of the present invention is shown in FIG. 2. It includes a paper transport mechanism 10 which automatically moves a page of characters into position and then stops the page. After all characters on the page have been read, a new page is moved into position. The page is assumed to be located at the edge 12 of block 10. When the page comes to a complete stop, the paper transport mechanism produces a pulse at output lead 14 which is aplied to the search and centering circuits 16.

The search and centering circuits 16 perform a number of functions. These are discussed in more detail later. In brief, the search and centering circuits actuate the flying spot scanner 18, causing it to locate the characters on the page in sequence, and cause it to superimpose over each character a television type raster in order to read out each character. The flying spot produced by the scanner 18 is projected onto the page being scanned by an optical system shown schematically as a lens 20. The light reflected from the document is received by two photomultipliers 22 and 24. They are equally spaced from the center of the page being scanned. Two photomultipliers are used rather than one to cancel the effects of the different distances from the photomultipliers of the particular characters being scanned. In brief, the decrease in light intensity picked up by one of the photomultipliers as its distance from the character being scanned increases, is compensated by the increase in light intensity picked up by the other photomultiplier.

The outputs of the two photomultipliers are combined and applied to video amplification and shaping circuits 26. These circuits produce a quantized video output at lead 77 which is applied to the search and centering circuits 16 and an amplified video output at lead 28 which is applied to the kinescope circuits 30. The kinescope circuits 30 deflect the electron beams of the kinescope and produce on its screen a display of the character being scanned. In the system of the present invention, the kinescope 32 is a dual beam kinescope. One of the beams of the kinescope writes a positive image of the character on the screen and the other beam of the kinescope writes a negative image of the character on the screen.

The positive and negative images appearing on the kinescope are applied to the input end of an optical tunnel 36. The purpose of the optical tunnel is to translate the positive and negative image of one character appearing at its input end into a plurality of positive and negative images of the one character. The optical tunnel itself may consist of four blocks of optical glass placed together so as to form a central opening or "tunnel" of square cross-section. The internal surfaces of this tunnel are reflecting mirror surfaces. It is possible to use a tunnel of triangular or other regular polygon cross-section; however, one of square cross-section is preferred. Optical tunnels and their operating characteristics are discussed in Patent No. 2,887,935, issued to L. B. Scott on May 26, 1959, and elsewhere in the literature.

The multiple characters at the output end of the optical tunnel are projected through an optical system shown as lens 34 onto a mask 37 of all of the characters which might possibly appear on the page. Each character on the mask is printed on the mask in the form of a positive image of the character immediately adjacent to a negative image of the same character. The characters are so arranged on the mask that the positive image of the character at the output end of the optical tunnel superimposes over the negative image of the character on the mask and the negative image at the output end of the tunnel superimposes over the positive image of the character on the mask. Accordingly, the mask character which most accurately matches the character projected by the optical tunnel passes the minimum amount of light to its associated photomultiplier channel.

FIG. 2 indicates that the mask has $n$ characters. There is a lens behind each mask character. The lenses are shown schematically in dashed block 35. The light output of each mask character is applied through the lens associated therewith to a different one of the $n$ photomultiplier channels 38. The outputs of the $n$ multiplier channels are applied to $n$ integrator channels 39, respectively.

In the operation of the system 37–39, the character on the mask which matches the character coming from the optical tunnel produces minimum light output. The light passing through the various mask characters is applied to the different multiplier channels. The multiplier channels translate the light into current. The integrator channels integrate the currents they receive and store these currents as charges. The integrator channel receiving the current of lowest amplitude stores the charge of lowest amplitude. This channel corresponds, of course, to the character recognized.

The system components 36, 37, 38, 39 and 40 are in themselves known and are not discussed in further detail here. They are described in an article by S. Klein, the present inventor, titled "All Electronic Reading Machine" appearing in the RCA Engineer, volume 7, No. 2, August-September 1961.

The outputs of the integrator channels 39 are applied to $n$ comparator channels 40. There they are compared with a sweep waveform generated in circuit 42. The sweep waveform causes an output to be produced from the comparator channel 40 connected to the integrator storing the lowest amplitude charge. The output of this channel is passed through reject circuits 44 and translated by encoder 43 into a digital code. This code is applied to a digital computer, or to some other digital data handling system.

The purpose of reject circuits 44 is to disable the encoder in the event that there is some question as to whether the correct character has been sensed. The reject circuits sense whether or not the lowest amplitude integrated signal is very close to the integrated signal of next higher amplitude. In the event that these two signals differ in amplitude by only a very small amount, it is an indication that the character sensed may be erroneous and in this case it is rejected. In one practical system when a character is rejected, the encoder causes a special reject character to be stored.

*Search and centering circuits*

Figure 3A:
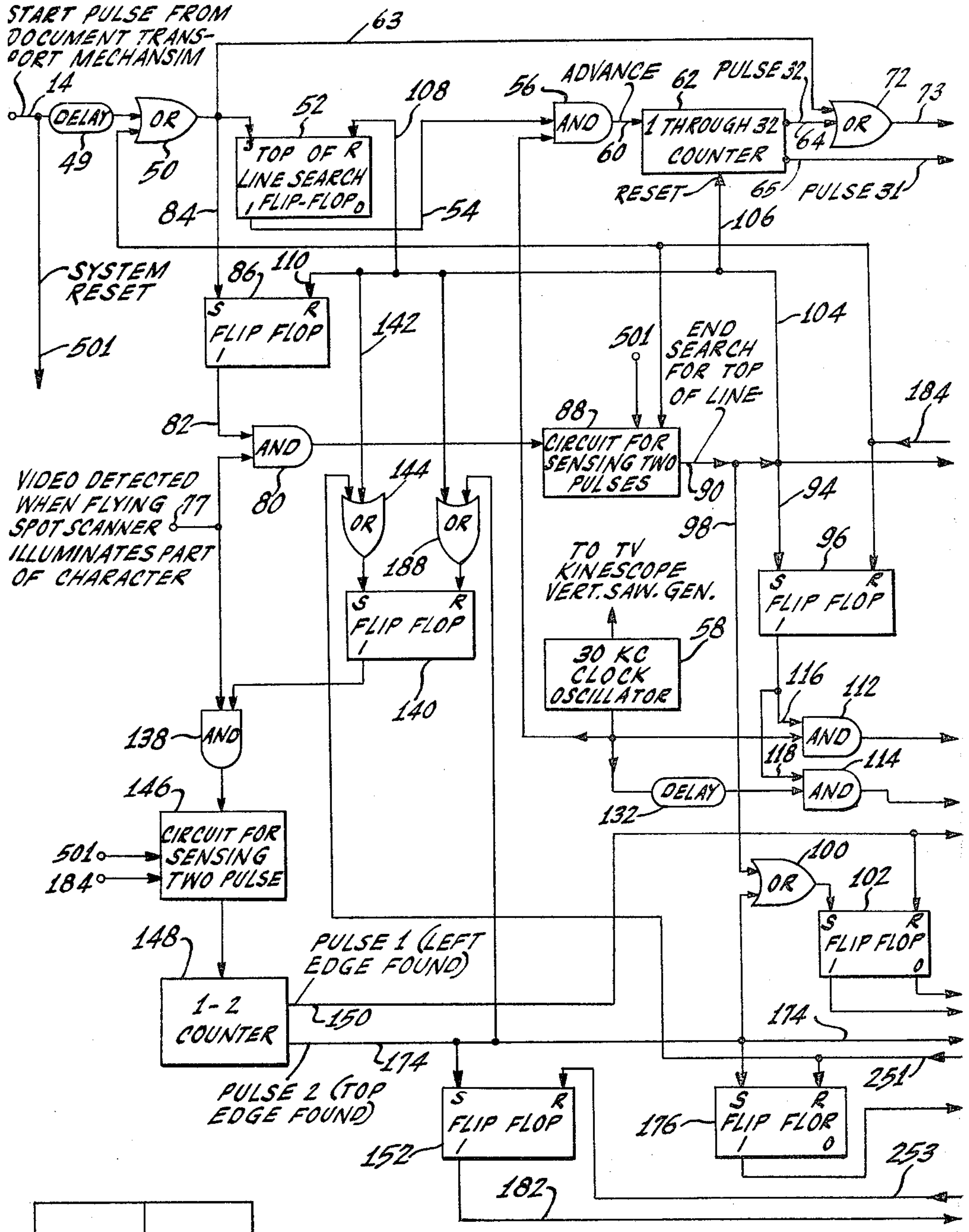
FIGS. 3*a* and 3*b*, together, comprise a block circuit diagram of the search and centering circuits of FIG. 2.
Figure 3A:
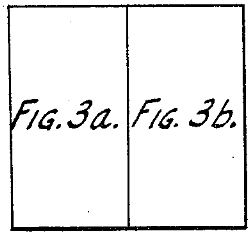
Figure 3B:
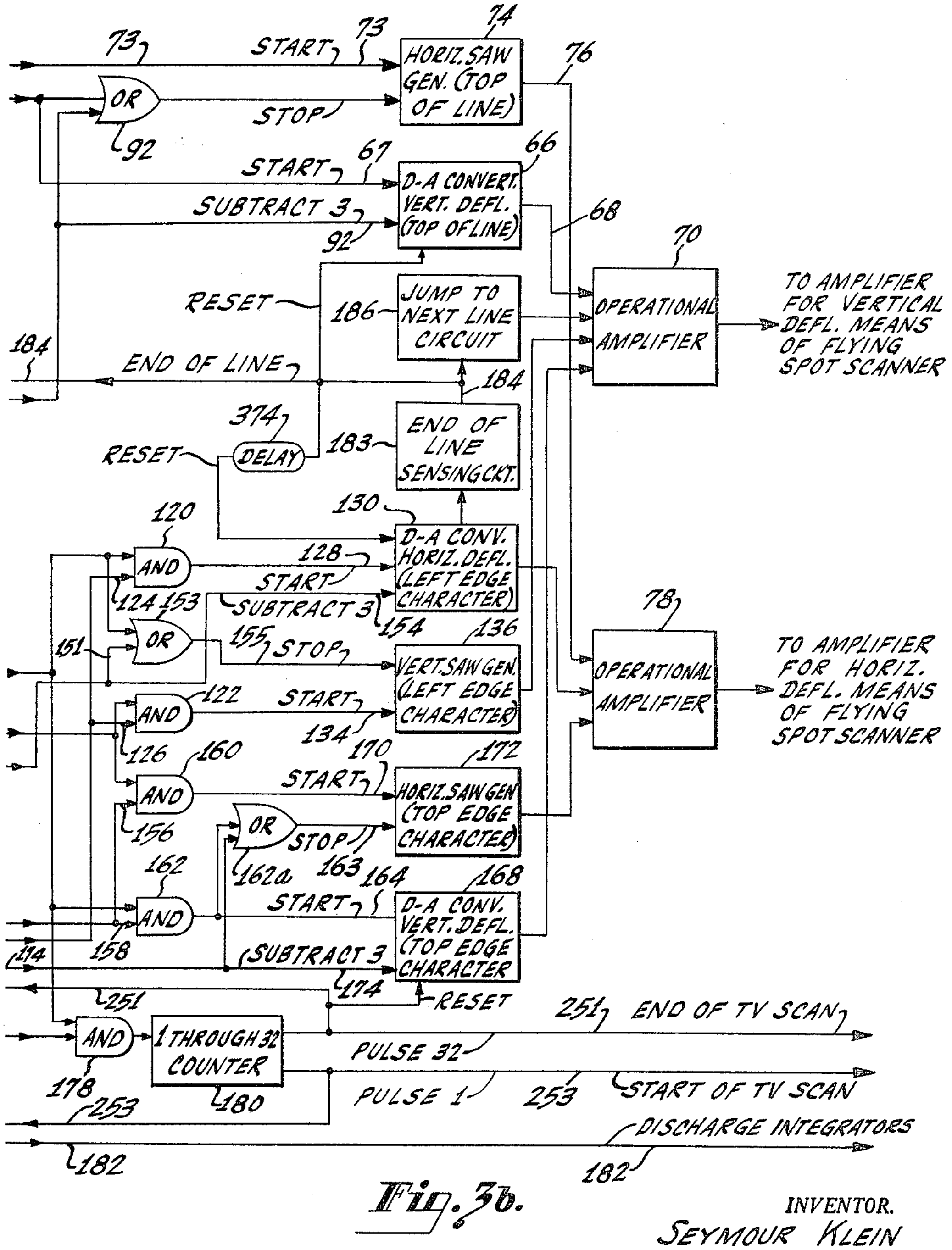

FIG. 3 (comprising FIGS. 3*a* and 3*b* taken together) is a simplified block diagram of the circuits in block 16 of FIG. 2 for centering the scanning raster of the flying spot scanner with respect to the character being scanned. As previously mentioned, the document transport mechanism (shown schematically at 10 in FIG. 2) sequentially feeds documents to a position in front of the flying spot scanner so that the characters on the document can be read. When a document is in position, it is stopped and a signal is applied from the document transport mechanism via lead 14 through the delay means 49 to "or" gate 50. The signal may be one from a microswitch, for example, which is actuated when the document momentarily stops its motion.

The output pulse of the "or" gate 50 is applied to the set terminal of flip-flop 52 and, via lead 84, to the set terminal of flip-flop 86. The "one" output which then appears at the 1 output terminal flip-flop 52 is applied via lead 54 as a priming signal to "and" gate 56. The second input to the "and" gate 56 is from the 30 kc. clock oscillator 58 shown near the center of FIG. 3*a*. The latter is a highly stable oscillator and is preferably crystal controlled. It produces pulses of short duration.

The pulses from clock oscillator 58 pass through "and" gate 56 and are applied to the advance terminal 60 of the 1 through 32 counter 62. The 1 through 32 counter may be a conventional ring counter having, for example, 32 flip-flop stages. The purpose of the counter is to divide the input frequency to a lower value. The counter may have a first output terminal 64 connected to the 32nd stage for producing one output pulse and a second output terminal 65 connected to the 31st stage for producing another output pulse. The frequency of the output pulses appearing at these terminals is approximately 1 kc.

The 31st pulse from the counter 62 is applied to a digital-to-analog converter 66. Its purpose is to produce a step-type waveform on lead 68 and to apply the same to an operational amplifier 70. The latter applies its output through other circuits, which are discussed later, to the vertical deflection means of the flying spot scanner.

The 32nd pulse from the counter 62 and the pulse from the document transport mechanism (lead 63, top of FIG. 3*a*) are applied to "or" gate 72. The output of the latter is applied to the start input terminal of the horizontal sawtooth generator 74. This circuit produces a sawtooth sweep in response to each input pulse it receives. Accordingly, the sawtooth sweep frequency is approximately 1 kc. The sawtooth sweep is applied via lead 76 to the operational amplifier 78 (lower right of FIG. 3*b*). The latter applies its output through other circuits, which are discussed later, to the horizontal deflection means of the flying spot scanner.

In the operation of the circuit discussed so far, when the start pulse from the document transport mechanism is received, the electron beam of the flying spot scanner begins its scan. The starting position of the scan is such that the spot of light derived from the electron beam is at the upper left corner of the document. The scan is in the horizontal direction and is across substantially the entire document. After one scan is completed, the digital-to-analog converter 66 produces one step so that the next horizontal scan begins under the first horizontal scan. The purpose of the successive horizontal scans is to determine the position of the top of the highest character in the first line.

When the light from the horizontally scanned beam of the flying spot scanner (FIG. 2) which is projected by the lens (FIG. 2) onto the document intersects the top of the highest character, the video processing circuits (FIG. 2) produce an output video pulse. The video pulse is applied from input terminal 77 (left center of FIG. 3*a*) to one of the inputs "and" gate 80. The second input 82 to the "and" gate is already priming this "and" gate. It should be recalled that flip-flop 86 was set by the output of "or" gate 50 and that its 1 output is a "one."

The video pulse from terminal 77 passes through "and" gate 80 to the circuit 88 for sensing two pulses. Details of circuit 88 are given later. Its purpose is to distinguish between a video signal resulting from a speck of dirt or other factitious marking on the document and the top of the highest letter in the line. This circuit produces an output only when it receives two video pulses in succession in two consecutive scan lines. Two such pulses in succession have been found to provide a reliable indication of the presence of a character rather than of a speck of dirt or the like.

The output of circuit 88 is applied via lead 90 to a number of other stages. First, it is applied to a circuit in the digital-to-analog converter 66 which essentially subtracts 3 from the count recorded on the converter. The effect is to remove three increments of output voltage (three steps) from the direct current signal available at lead 68. This, in turn, corrects the vertical deflection voltage applied to the flying spot scanner to a value such that the horizontal scan will begin one line above the line at which the projected light beam derived from the flying spot scanner intersects the character on the document.

The output of circuit 88 is also applied through "or" gate 92 (upper right of figure) to the stop terminal of the horizontal sawtooth generator 74. This signal inactivates the horizontal sawtooth generator. The signal from stage 88 is also applied via lead 94 as a set signal for flip-flop 96. It is also applied via lead 98 and through "or" gate 100 as a set signal for flip-flop 102.

A further function performed by circuit 88 is that of disabling some of the stages employed to search for the top of the character. Thus, a signal is applied via leads 104 and 106 to reset the 1 through 32 counter 62. A reset signal is also applied via leads 104 and 108 to reset top of line search flip-flop 52. This disables "and" gate 56. A reset pulse is also applied via leads 104 and 110 to the reset terminal of flip-flop 86. This disables "and" gate 80.

Recapitulating the circuit operation so far, when the start pulse from the document transport mechanism appears, a search is initiated for the top of the highest character in the first line of printing. When the top of the character is found, information as to the position of the top of the character is stored in circuit 66 for later use. Additionally, certain circuits are enabled to permit the next step in the raster centering process to begin. Additionally, certain other circuits are disabled to prevent continuation of the search for the highest character in a line.

The next step in the process of centering the flying spot scanner raster is that of locating the left edge of the first character on the first line. Flip-flop 96 is set, having been set by the "end search for top of line" pulse on lead 94. This primes "and" gates 112 and 114 via inputs 116 and 118. Similarly, set flip-flop 102 (lower right of FIG. 3*a*) primes "and" gates 120 and 122 via inputs 124 and 126, respectively.

The pulses from the clock oscillator 58 now pass through "and" gate 112 and "and" gate 120 to the start input terminal 128 of the digital-to-analog converter 130. The purpose of this converter is to produce a step waveform which is applied through operational amplifier 78 and other circuits to the horizontal deflection means of the flying spot scanner. The same pulses from the clock oscillator 58, slightly delayed by delay means 132, are applied through "and" gates 114 and 122 to the start input terminal 134 of the sawtooth generator 136. The latter produces a sawtooth sweep in response to each input pulse it receives. The sweep therefore has a recurrence frequency of 30 kc. The sawtooth sweep is applied through operational amplifier 70 and other circuits to the vertical deflection means of the flying spot scanner.

The purpose of the circuits just discussed is to produce successive vertical scans starting somewhat to the left of the first character in the line. Each scan is sufficiently long so that it will go through the longest character to be encountered even if that character is displaced slightly (misregistered) from the remaining characters in the line. These scans continue until the light projected by the lens system intersects the left edge of the first character. At that time, a video pulse is applied to terminal 77 at the left of the figure. This pulse is applied both to "and" gates 80 and 138. "And" gate 80 is disabled but "and" gate 138 is primed by the "one" output available at the 1 terminal of flip-flop 140. The flip-flop is set. It was set by an "end-of-search for top of line pulse" applied from circuit 88 via lines 90, 104 and 142 and to "or" gate 144. When two successive video pulses on two consecutive scan lines pass through "and" gate 138, the circuit for sensing two pulses 146 (lower left of figure) produces an output which is applied to the 1–2 counter 148.

1–2 counter 148 may include a two stage counter followed by pulse shapers which convert the direct current level outputs of the counter to 3 microsecond pulses. The shapers, for example, include a differentiator followed by a monostable multivibrator or a circuit such as 320, 332, 352 of FIG. 6. In response to the first input pulse received by counter 148, the counter produces a "one" output pulse at lead 150. This "one" output is applied to the reset terminal of flip-flop 102 and to the subtract 3 input terminal 154 of digital-to-analog converter 130. Terminal 154 leads to a circuit in the digital-to-analog converter 130 which essentially substracts 3 from the count recorded on the converter. The result is to subtract 3 voltage increments from the step waveform produced by the converter and applied to the amplifier 78. The amplifier, in turn, reduces the deflection voltage applied to the flying spot scanner by three steps. The converter 130 therefore now stores a voltage corresponding to the deflection of the flying spot scanner beam along a line just to the left of the left edge of the first character it is desired to scan.

The "one" output pulse on lead 150 is also applied to lead 151 of "or" gate 153. Therefore, the vertical sawtooth generator 136 is reset by the clock pulse from "and" gate 112 or the output pulse on lead 150.

When flip-flop 102 is reset, the priming signal is removed from "and" gates 120 and 122. These two gates therefore become inactive. At the same time a priming signal is applied via leads 156 and 158 to "and" gates 160 and 162. Now the pulses from the clock oscillator 58 are applied through "and" gate 112 and "and" gate 162 to the start terminal 164 of digital-to-analog converter 168. The pulses from "and" gate 162 are also applied via "or" gate 162*a* to the stop terminal 163 of horizontal sawtooth generator 172. The pulses from clock oscillator 58 are also supplied through delay line 132, "and" gate 114, and "and" gate 160 to the start terminal 170 of horizontal sawtooth generator 172.

The purpose of the stages 168 and 172 is to provide deflection voltages for the flying spot scanner. The deflection voltages are such as to determine the top edge of the first character it is desired to scan. The scan is in the horizontal direction and the stepped output of stage 168 is applied to the vertical deflection means. Each scan is only slightly longer than the widest character expected to be encountered.

When two successive video pulses in two successive scan lines appear at input terminal 77 (left of FIG. 3*a*), these are applied through still enabled "and" gate 138 to the circuit for sensing two pulses 146. The latter advances the count of counter 148 by one. A "one" output now appears at output lead 174. This "one" output sets flip-flops 152 and 176 directly and sets flip-flop 102 via "or" gate 100. The "one" is also applied through "or" gate 188 to the reset terminal of flip-flop 140. Resetting of flip-flop 140 prevents video signals on lead 77 from entering the system during the television scan period (the period during which a character is read out).

The "one" signal on lead 174 is also applied to the subtract 3 circuit of the digital-to-analog converter 168 and, through "or" gate 162*a*, to the "stop" terminal 163 of horizontal sawtooth generator 172. The function of the subtract 3 circuit is similar to that already described for the other similar stages. In brief, three steps are subtracted from the output of stage 168 and this stage stores a voltage corresponding to the deflection of the flying spot scanner beam along a horizontal line just above the first character it is desired to scan.

When flip-flop 176 is set, its "one" output primes "and" gate 178. The next output pulse of the clock oscillator 58 passes through "and" gate 112 and "and" gate 178 to the 1 through 32 counter 180. The first pulse of the counter is applied to a gate circuit for the scanning circuits of the flying spot scanner. When this gate circuit is enabled, the vertically scanned raster for viewing the now centered character starts. The voltages stored at this time in the digital-to-analog converters 130 and 168 are the reference coordinates for the upper left edge of the character to be scanned.

Figure 9:
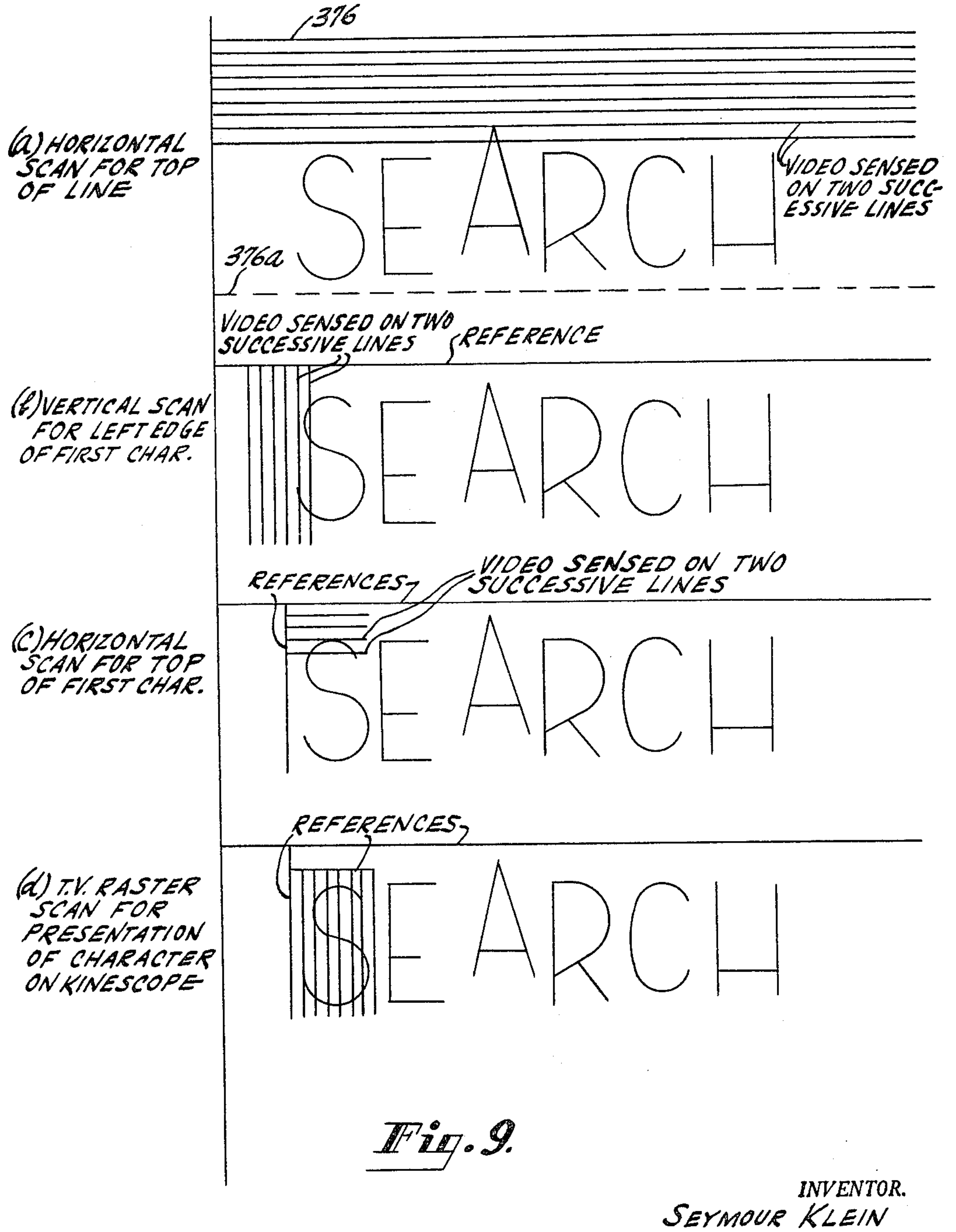
FIG. 9 is a drawing illustrating the manner in which a character is located and centered.

The process of searching for a character and centering the raster over the character is illustrated in FIG. 9. The spacing between successive scan lines is exaggerated. In other respects, the figure is self-explanatory.

The setting of flip-flop 102 (lower right, FIG. 3*a*), as mentioned previously, by the "one" output on line 174 initiates the vertically scanned raster for viewing the now centered character. Flip-flop 102 primes "and" gates 120 and 122 which allows the 30 kc. clock signal and the delayed 30 kc. clock signal to be fed to the digital-to-analog converter 130 and the vertical sawtooth generator 136, respectively.

At the same time that the character is being scanned by the flying spot scanner, a raster is generated in the correlation display kinescope. This raster is in synchronism with the scan of the character. The signals for initiating the display kinescope waveforms are obtained from the counter 180. When flip-flop 176 is set, its "one" output primes "and" gate 178 to the 1 through 32 counter 180. The first pulse of the counter is applied to the correlation kinescope display circuits to initiate the display.

The elapsed time (8 to 33 ms.) between the location of the top of the character and the start of the scanning or display cycle is used to remove the "previous history" or charge on the photomultiplier integrators (discussed later) and prepare the system for the "correlation" cycle. The integrator discharge starts when flip-flop 152 is set by the "one" appearing on line 174. The integrator discharge ends when the first pulse from counter 180 resets flip-flop 152. Thus, the integrator circuits are operative during the time the raster is being employed to scan the first character.

There are 32 lines to the raster. The 32nd pulse from counter 180 terminates the scan in the correlation display kinescope (end of TV scan, lead 251, lower right, FIG. 3*b*). It also terminates the scan of the flying spot scanner and prepares the system for searching for the next character in the line. This is accomplished by resetting the digital-to-analog converter 168 (top edge character) to zero so that the system starts to search for the next character from the datum line established by the digital-to-analog converter 66. The 1 to 32 counter 180 is disabled by resetting the flip-flop 176 with the delayed count 32 pulses on lead 251. In order to prepare the system for detecting the next character, the circuit for sensing two pulses 146 is enabled by priming "and" gate 138. This is accomplished by setting flip-flop 140 via "or" gate 144 by the count 32 pulse from counter 180.

After the first character has been scanned, the succeeding characters on the same line are scanned in the same manner, as already discussed. During this period, "and" gate 138 is enabled and "and" gate 80 is disabled. Thus, the circuits determine only the top edge and left edge of the next character in the line and then scan the next character with the raster.

The characters on the line are scanned by a raster, that is, read, in sequence, until the last character is read. At that time, the end of line sensing circuit 183 senses the end of the line and produces an output signal at lead 184. This signal is applied to the "jump to next line" circuit 186. It produces an output voltage which is applied through the operational amplifier 70 and other circuits to the vertical deflection means of the flying spot scanner. This voltage positions the beam of the flying spot scanner to a point such that the search for the highest character in the next line can be started.

The end of line signal on lead 184 is applied as a reset signal to flip-flop 96 (right center, FIG. 3*a*) thereby inactivating "and" gates 112 and 114. It is also applied as a reset signal to flip-flop 140 (center left, FIG. 3*a*) through "or" gate 188. The reset flip-flop 140 inactivates "and" gate 138. The end of line signal is also applied through "or" gate 50 as a set signal for flip-flops 86 and 52 (upper left, FIG. 3*a*). Set flip-flop 86 enables "and" gate 80. Set flip-flop 52 enables "and" gate 56. Accordingly, the circuits are now in condition to start the search for the top of the character in the next line.

Figure 4:
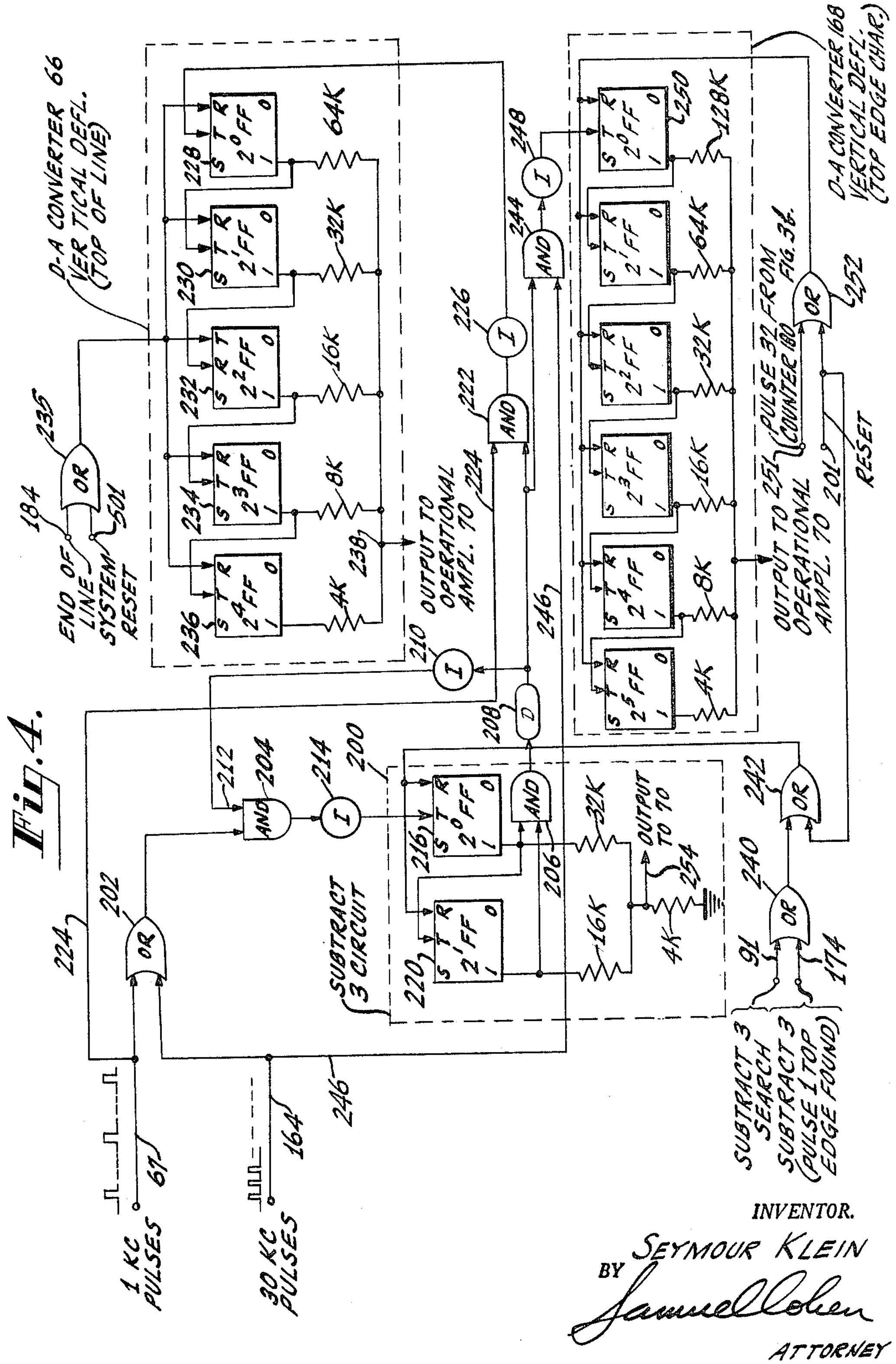
FIG. 4 is a block circuit diagram of certain digital-to-analog converter circuits of FIG. 3.

*Figure 4*

FIG. 4 is a more detailed showing of the digital-to-analog converter 66 and the digital-to-analog converter 168 of FIG. 3. Digital-to-analog converter 130 is similar and is not discussed separately. In the discussion of FIG. 3 a subtract 3 circuit for each converter is mentioned. In practice, this subtract 3 circuit is common to both digital-to-analog converters. It is shown at 200 in FIG. 4.

It will be recalled from the discussion of FIG. 3, that initially "and" gate 56 (top center, FIG. 3*a*) is enabled and the counter 62 applied pulses at a frequency of approximately 1 kc. to the digital-to-analog converter 66 via lead 67. The "and" gate 112 (right center, FIG. 3*a*) is initially disabled so that the 30 kc. pulses are not applied to the digital-to-analog converter 168.

The 1 kc. pulses discussed above appear at lead 67 at the upper left of FIG. 4. These pass through "or" gate 202 to "and" gate 204. All of the flip-flops in the circuit of FIG. 4 are assumed initially to be reset. This means that "and" gate 206, which is shown below the subtract 3 circuit 200, has a "zero" output. This "zero" output is delayed by delay means 208 and applied to inverter 210. The inverter changes the "zero" to a "one" and applies it as a priming signal to input lead 212 of "and" gate 204. Therefore, the 1 kc. pulses pass from "or" gate 202 through "and" gate 204.

The pulses passing through "and" gate 204 are applied through inverter 214 to the trigger terminal of flip-flop 216. These pulses (negative-going) change the state of the flip-flop. The first pulse causes the "one" output of flip-flop 216 to go high (to represent the binary digit "one"). The positive-going signal available at terminal 218 is applied to the trigger terminal of flip-flop 220 but has no effect on flip-flop 220. The next input pulse to flip-flop 216 changes the "one" output to a "zero" (a negative-going voltage). The negative-going voltage applied to the trigger terminal of flip-flop 220 changes the state of flip-flop 220. The latter thereupon produces a "one" at its "one" output.

The third input pulse to the trigger terminal of flip-flop 216 again changes the state of flip-flop 216. The subtract 3 circuit 200 now produces an output 1, 1. This enables "and" gate 206 so that it produces a "one" output. The "one" output is delayed by delay means 208 and inverted by inverter 210. The corresponding "zero" output of the inverter disables "and" gate 204 preventing the further application of pulses to the subtract 3 circuit.

The "one" output of delay means 208 is applied as an enabling signal to "and" gate 222. Accordingly, a fourth input pulse present on input lead 67, which is applied to "and" gate 222 via lead 224, passes through "and" gate 222 and inverter 226. The "zero" output of the inverter (a negative-going voltage) is the triggering voltage for the first stage 228 of the digital-to-analog converter 66.

The digital-to-analog converter 66 is shown to have four additional flip-flops 230, 232, 234 and 236. Each flip-flop trigger terminal is connected to the 1 output terminal of the flip-flop representative of the binary bit of lower rank. The interaction among the flip-flops is similar to that already discussed for the subtract 3 circuit. The various flip-flop outputs are applied through resistors to a common output terminal 238. The values of resistors are different for each flip-flop, each value corresponding to a different power of 2. The reason is given shortly.

When the top edge of the highest character in the line being scanned has been detected, a pulse appears at lead 91 (lower left of FIG. 4). This pulse is the output of the circuit 88 for sensing two pulses of FIG. 3. The pulse is applied through "or" gate 240 and "or" gate 242 to the reset terminals of the flip-flops in the subtract 3 circuit. The effect of resetting the flip-flop is to subtract 3 steps from the output current applied to the operational amplifier 70 as is explained in more detail shortly. The reset condition of the flip-flop is sensed by "and" gate 206 which now becomes disabled. As a result, a priming voltage, a "one," is applied to lead 212 of "and" gate 204 through inverter 210. Also, a disabling voltage is applied to "and" gate 222 and to "and" gate 244.

As previously discussed in connection with FIG. 3, when the top of the highest character in the line being scanned has been detected, "and" gate 56 (FIG. 3*a*) is disabled, counter 62 is reset and no further output pulses are applied from the counter 62 to lead 67. At a later time, that is, after the left edge of the first character has been found, the search for the top edge of the first character begins. At this time, "and" gate 162 (FIG. 3*b*) becomes enabled and the 30 kc. pulses appear at lead 164 (upper left of FIG. 4). These, 30 kc. pulses, pass through "or" gate 202 to enable "and" gate 204. They pass through the "and" gate to the trigger terminal of the subtract 3 circuit. As in the previous example, after the substract 3 circuit has counted up to three, "and" gate 206 becomes enabled and applies a disabling signal to "and" gate 204. "And" gate 206 also applies an enabling signal to "and" gate 244. Therefore, the fourth 30 kc. input pulse is prevented from passing through "and" gate 204. However, this fourth pulse is applied via lead 246 to "and" gate 244 and passes through the "and" gate 244 to inverter 248. The inverted pulses are applied to the trigger terminal of the first flip-flop stage 250 of the digital-to-analog converter 168. The digital-to-analog converter now begins to count the input pulses in the manner already discussed. For purposes of illustration, a six stage converter 168 is shown, however, it is to be understood that there may be more than six stages if required.

When the top edge of the character is found, a pulse appears at lead 174 and is applied through "or" gates 240 and 242 to the reset terminals of the subtract 3 circuit. At some later time after the raster scan has been completed, a reset pulse which is derived from counter 180, FIG. 3*b*, is applied via lead 251 through "or" gate 252 to the reset terminals of the digital-to-analog converter 168.

The purpose of the circuits just discussed is to provide a step output voltage to the operational amplifier 70. Each step of the wave produced should be of precisely the same amplitude. Each step corresponds to a deflection of the electron beam of the flying spot scanner a fixed distance in the vertical direction. This distance, in the case of the digital-to-analog converter 66, may correspond to .0025 inch on the document.

Figure 15:
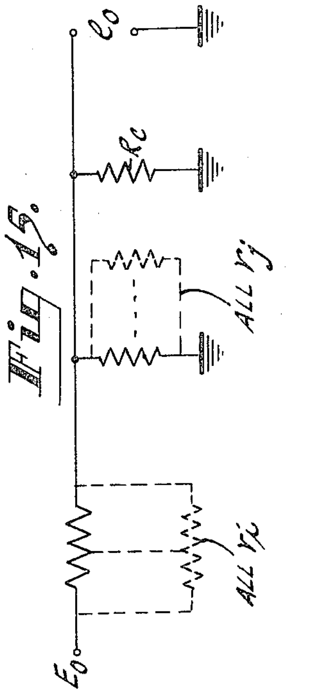
Figure 14:
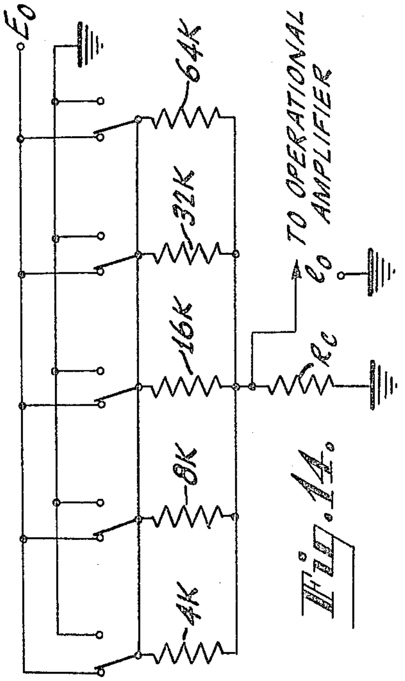

The manner in which the conversion is accomplished may be more readily understood by the following discussion. Each of the flip-flops may be considered as single pole, double throw switches which switch between a low impedance source, $E_0$ and ground. The equivalent circuit for digital-to-analog converter 66 is shown in FIGS. 14 and 15. From the equivalent circuit of FIG. 15, the equation of the output voltage of the converter may be derived as follows:

$$e_0=E_0\frac{\sum\frac{1}{r_i}}{\frac{1}{R_0}+\sum\frac{1}{r_j}+\sum\frac{1}{r_i}}$$

$$\sum\frac{1}{r_j}+\sum\frac{1}{r_i}=\sum_0^n\frac{1}{r_k}$$

$$\therefore e_0=E_0\frac{\sum\frac{1}{r_i}}{\frac{1}{R_0}+\sum_0^n\frac{1}{r_k}}$$

For decoding binary numbers $$r_k=\frac{R}{2^k}$$

$$\sum_0^n\frac{1}{r_k}=\frac{2^0}{R}+\frac{2^1}{R}+\cdot\quad\cdot\quad\cdot+\frac{2^n}{R}=\frac{1}{R}(2^{n-1}-1)$$

also $$\sum\frac{1}{r_j}=\sum\frac{2^j}{R}=\frac{1}{R}\sum 2^j=\frac{1}{R}p$$

where $p$ is the value of the number to be decoded.

By algebraic manipulation $$e_0=\frac{E_0}{\frac{R}{R_0}+2^{n+1}-1}[2^{n+1}-1-p]$$

The change in output voltage per unit change in number is $$\frac{\Delta e}{\Delta p}=\frac{E_0}{\frac{R}{R_0}+2^{n+1}-1}$$

where R=largest digital-to-analog converter resistor and $R_c$ is effectively a loading resistor. It is advantageous to make $R/R_c$ as high as possible and in the implementation of the invention shown $R_c$ is the input impedance of the summing amplifier. In one practical circuit, the output of the binary digital-to-analog converter 66 is approximately $$\frac{6.5}{32}\approx 0.2$$

volts per step. This is further modified by scaling in the summing operational amplifier to be 0.08 volt per step. Some typical values of voltage for various counts are:

| Count | Voltage |
|---|---|
| 00000 | 0 volts |
| 00001 | 0.08 volts |
| 00010 | 0.16 volts |
| 00011 | 0.24 volts |

The subtract 3 circuit works in a similar manner. The values of resistors and voltages are so chosen that each increment available at output terminal 254 is .08 volt. It will be recalled that the subtract 3 circuit, however, only counts three voltage increments and is then inactivated. The total voltage applied to the operational amplifier during one mode of operation as, for example, the search for the top of the line, is the sum of the voltage produced by the subtract 3 circuit and the voltage produced by the digital-to-analog converter 66. Assume, for example, that the top edge of the highest character in the line is found when the count on the subtract 3 circuit 200 is 11 and the count on the digital-to-analog converter 66 is 10011. The count 11 corresponds to 0.24 volt. The count 10011 corresponds to 1.52 volts. The total voltage therefore applied to the operational amplifier 70 is 1.76 millivolts. When the top edge of the first character is found, a reset pulse is applied to the subtract 3 circuit. The effect is to reduce the count by 11 or 0.24 volt. The remaining voltage, that is, the voltage supplied by the digital-to-analog converter 66 is 1.76 volts and this continues to be supplied to the operational amplifier until the last character in the line is read out. At that time, the digital-to-analog converter 66 is reset and it is necessary to search for the highest character in the next line. This is accomplished by the jump to the next line generator 186 (FIG. 3*b*) which adds a fixed voltage into the operational amplifier 70, and the search for the highest character in the line is done in the same manner as above.

The reset pulse for the system can be the start pulse from the document transport mechanism. Alternatively, it can be a pulse which is derived when the end of the last line on the page is sensed. These pulses are applied through "or" gate 235, FIG. 4.

The operation of the digital-to-analog converter 168 and the subtract circuit is similar to that already discussed and will not be discussed in detail. Similarly, the operation of the digital-to-analog converter 130 is similar to that of the converter already discussed. Also, its structure is similar and need not be shown.

In general, the digital-to-analog converter 130 which is connected to the horizontal operational amplifier has more stages than the digital-to-analog converter 168. The reason is that the former may have to produce sufficient voltage steps to permit search across almost the entire tube diameter in order to center and scan all of the characters on the line, whereas the digital-to-analog converter 168 will have to search through a much shorter distance to determine the top edge of the character.

*Operational amplifier and flying spot scanner amplifier*

Figure 5:
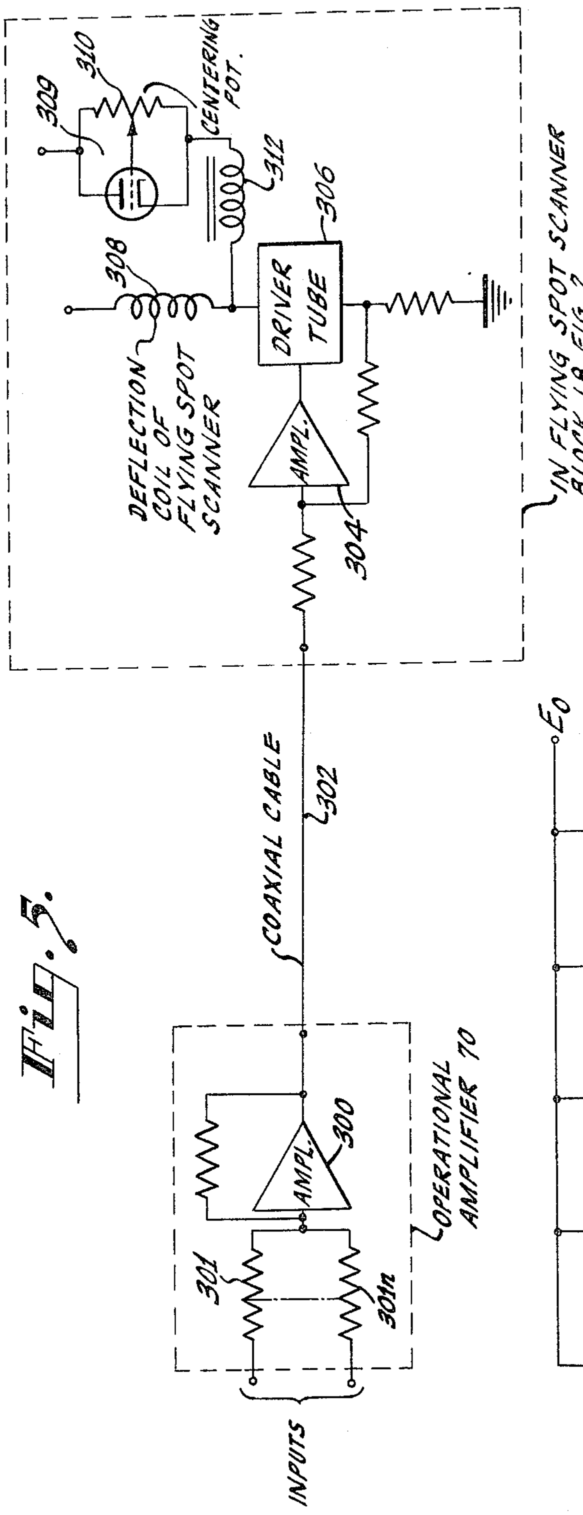
FIG. 5 is a block and schematic circuit diagram of an operational amplifier of FIG. 3 and of a deflection circuit for the flying spot scanner of FIG. 2.

The operational amplifiers 70 and 78 of FIG. 3 are conventional. The amplifier 70 is illustrated in FIG. 5 as a direct current feedback amplifier 300. The various inputs to the amplifier are applied through input resistors 301–301*m* of the amplifier. This amplifier can be used to drive the deflection circuits for the flying spot scanner directly, however, in a practical system the operational amplifier was in a different chassis than the flying spot scanner. The two chassis were located some 25 feet from one another and were connected by means of a coaxial cable 302. It was therefore found to be more practical to employ a separate amplifier 304 in the flying spot scanner. This amplifier is connected to the driver tube, shown schematically at 306. The driver tube is in series with the vertical deflection coil 308 of the flying spot scanner.

The centering adjustment for the flying spot scanner may include a triode 309, the control grid of which is connected to a voltage divider 310. The setting of the voltage divider controls the current passing through the deflection coil. The connection of the centering arrangement to the driver tube is by means of a radio frequency choke 312. The circuits for the horizontal scanning circuits and operational amplifier 78 are similar to those discussed above.

*Circuit for sensing two pulses*

Figure 6:
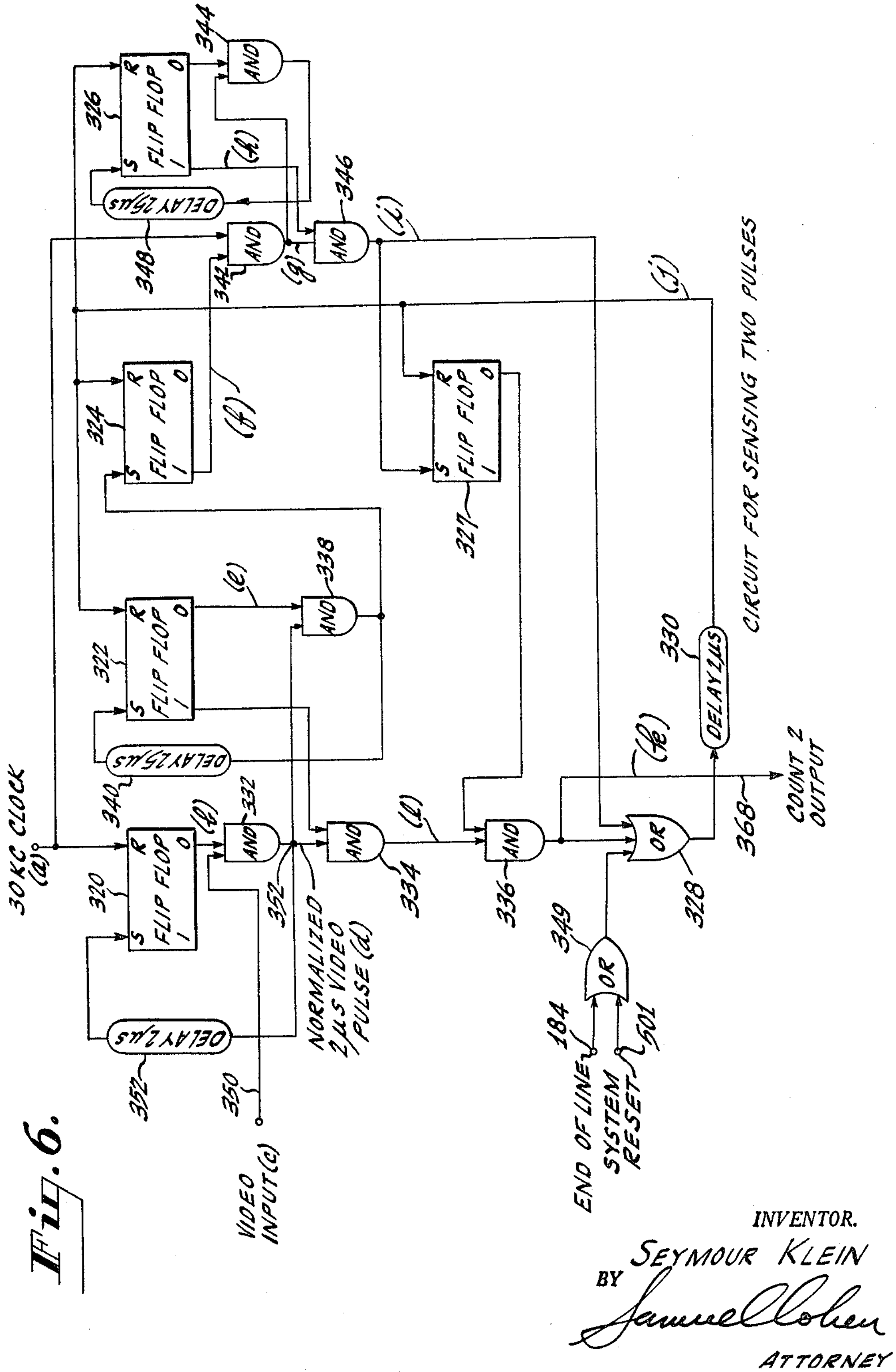
FIG. 6 is a block circuit diagram of a circuit of FIG. 3 for sensing two pulses.

A circuit for sensing two pulses is shown in FIG. 6. The circuit is similar for both blocks 88 and 146 of FIG. 3.

The circuit of FIG. 6 includes five flip-flops 320, 322, 324, 326 and 327. All flip-flops are initially reset. Flip-flop 320 is reset by a 30 kc. clock pulse. Flip-flops 322, 324, 326 and 327 are reset by a pulse applied through "or" gate 328 and delay line 330.

The 0 output of flip-flop 320 is applied to an "and" gate 332. Its output is applied to "and" gate 334 which in turn is connected to "and" gate 336.

The 0 output of flip-flop 322 is applied to an "and" gate 338 whose output is fed back to the set terminal of flip-flop 322 through delay line 340. The 1 output of flip-flop 324 is applied to "and" gate 342. "And" gate 342 is connected to "and" gates 344 and 346. The output of "and" gate 344 is applied back to the set terminal of flip-flop 326 through delay means 348. The output of "and" gate 346 is also applied to the set terminal of flip-flop 327. The 0 output of flip-flop 327 serves as one of the inputs to "and" gate 336.

Figure 7:
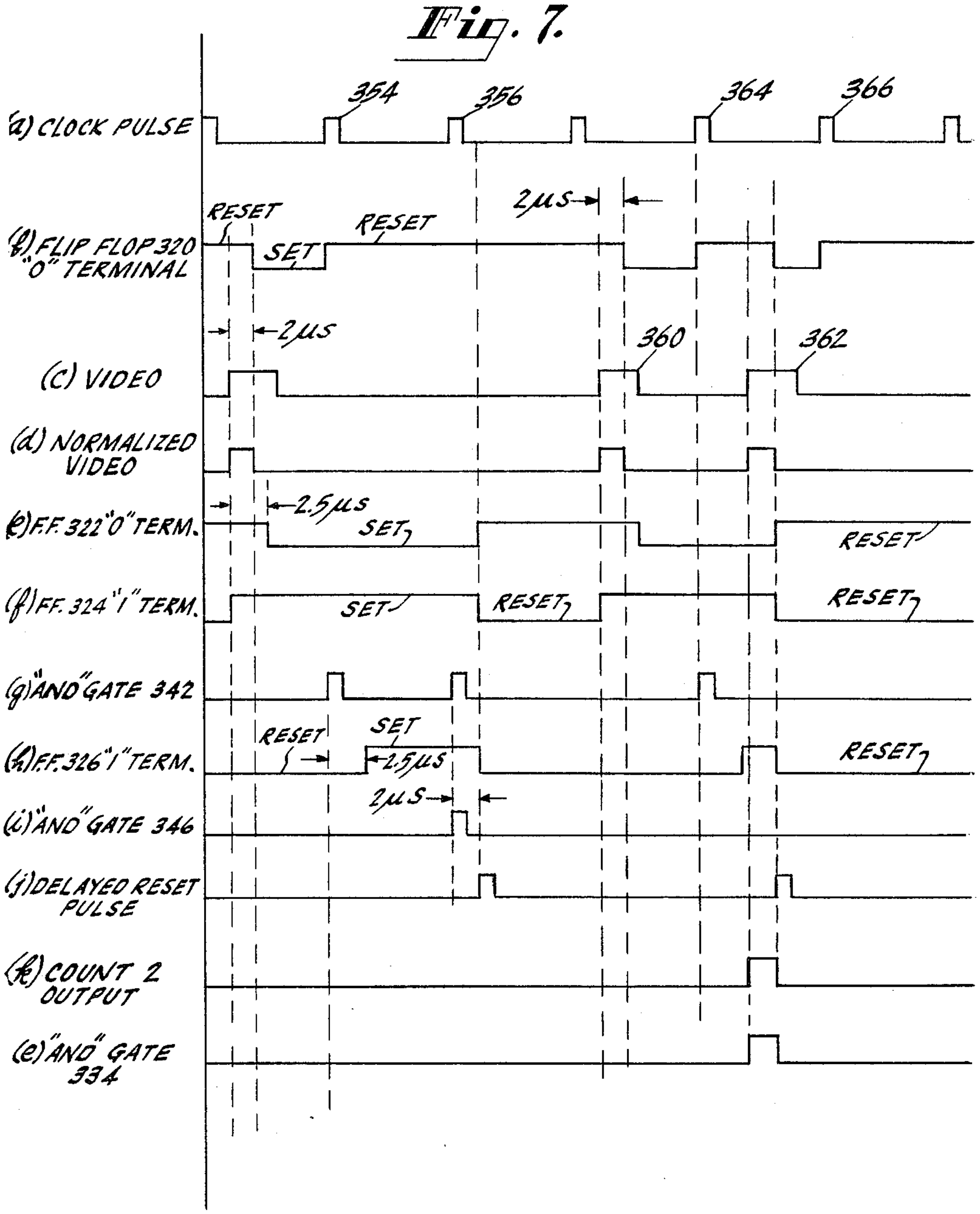
FIG. 7 is a drawing of waveforms to help explain the operation of the circuit of FIG. 6.

In the discussion which follows of the operation of the circuit of FIG. 6, both FIGS. 6 and 7 should be referred to. Assume first that a system reset pulse or an end-of-line pulse occurs. Either pulse is applied through "or" gate 349 and "or" gate 328 to delay means 330. The delayed pulse resets flip-flops 322, 324, 326 and 327. The first occurring 30 kc. pulse also rests flip-flop 320. Thus, all flip-flops are reset.

The first video pulse 353 which occurs is applied via lead 350 to "and" gate 332. This "and" gate is already primed by the "one" appearing at the 0 output of flip-flop 320. Accordingly, the "and" gate produces a "one" output which is fed back through delay means 352 to the set terminal of flip-flop 320. The delay means may insert a 2 microsecond delay. After the delay interval, "and" gate 332 is disabled and its output pulse terminates. The duration of the output pulse is accordingly equal to the delay inserted by the delay means, that is, 2 microseconds.

The "normalized" 2 microsecond pulse appearing at 352 is applied both to "and" gate 334 and "and" gate 338. "And" gate 334 is disabled; however, "and" gate 338 is enabled. Accordingly, the 2 microsecond pulses passes through "and" gate 338 and sets flip-flop 324. It is also applied back to the set terminal of flip-flop 322 through the 2½ microsecond delay line 340. After 2½ microseconds, the flip-flop 322 is set priming "and" gate 334. However, by this time the 2 microsecond output pulse at 352 has terminated so that nothing passes through "and" gate 334 as yet.

The set flip-flop 324 primes "and" gate 342. The next occurring 30 kc. clock pulse 354 (FIG. 7) resets flip-flop 320 and passes through "and" gate 342. The output of "and" gate 342 is applied to "and" gates 346 and 344. "And" gate 346 is disabled, however, "and" gate 344 is primed. Accordingly, "and" gate 344 produces an output which is applied back to the set terminal of flip-flop 326 through the 2½ microsecond delay line 348. The set flip-flop 326 now primes "and" gate 346 and disables "and" gate 344. The clock pulse 354 is over at this time so that "and" gate 346 does not produce an output.

Assume now that the next clock pulse 356 (see FIG. 7 as well as FIG. 6) occurs prior to the time that a second video pulse is applied to lead 350. The second clock pulse passes through still primed "and" gate 342 and primed "and" gate 346. Gate 346 now produces an output which is applied to the set terminal of flip-flop 327 and to "or" gate 328. Flip-flop 327 now disables "and" gate 336. This prevents the circuit from responding to a video pulse which occurs shortly after clock pulse 356. The pulse applied from "and" gate 346 to "or" gate 328 is applied through a delay means 330 to the reset terminals of flip-flops 322, 324, 326 and 327.

It is clear from the description above, that one video pulse only does not result in a "count two" output. Instead, all flip-flops become reset and the circuit then attempts again to sense two successive pulses on two successive lines.

Assume now that there are two successive video pulses on two successive lines. These are shown at 360 and 362 in FIG. 7. The first video pulse results in the same circuit conditions as discusesd above in connection with video pulse 353. The next occurring clock pulse 364 also causes the circuit to operate as discussed above. After clock pulse 364 occurs, flip-flop 320 is reset and flip-flops 322 and 324 are set. The clock pulse 364 has passed through "and" gate 342 and "and" gate 344. After 2½ microseconds, flip-flop 326 also becomes set.

Before the next clock pulse 366 arrives, a video pulse 362 is applied to lead 350. This video pulse 362 now passes through "and" gate 332. Flip-flop 322 is set so that the video pulse (normalized to 2 microseconds) passes through "and" gate 334. Flip-flop 327 is reset so that "and" gate 336 is primed. Accordingly, the normalized video pulse output of "and" gate 336 passes through "and" gate 336 to the count two output lead 368. the count two output 368 corresponds, for example, to lead 90 of FIG. 3. The output of "and" gate 336 is also applied via "or" gate 338 as a reset signal for flip-flops 322, 324, 326 and 328.

*End of line sensing circuit and jump to next line sensing circuit*

Figure 8:
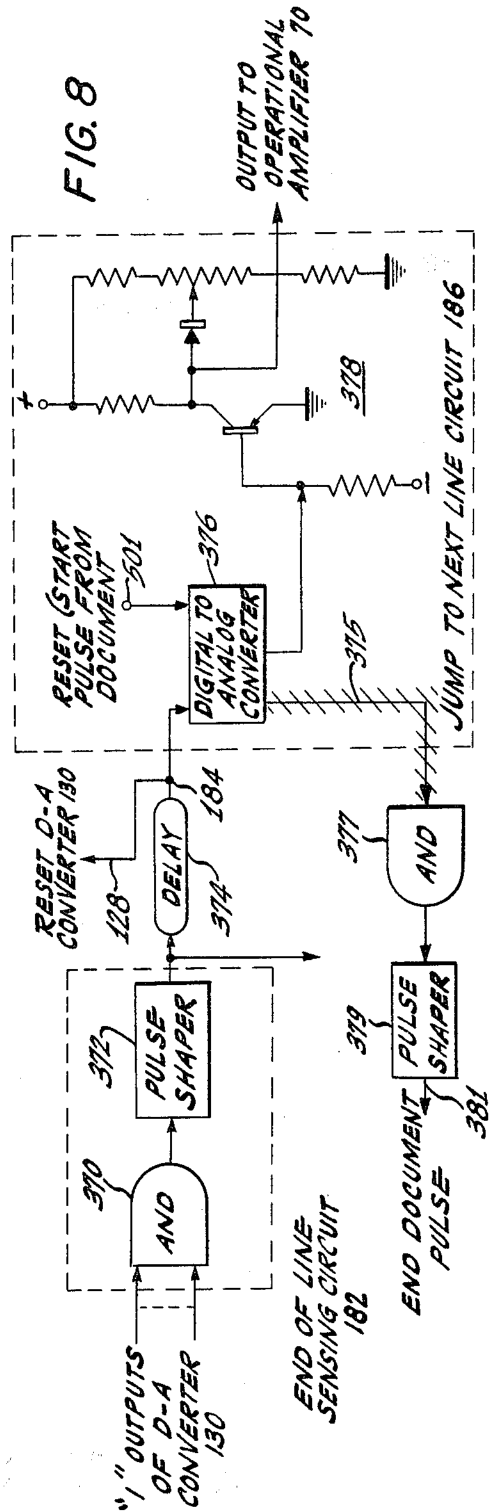
FIG. 8 is a block and schematic circuit diagram of the end-of-line sensing circuit and the jump-to-next line circuit of FIG. 3.

The end of line sensing circuit and jump to next line circuit of FIG. 3 are shown in more detail in FIG. 8. The former circuit includes an "and" gate 370 followed by a pulse shaper 372. The "and" gate is connected to the output terminals of the digital-to-analog converter 130. Accordingly, when the maximum count is recorded on the counter, "and" gate 370 produces an output. This output is applied to a pulse shaper which may, for example, include a delay line differentiator and bottom clipper. The output pulse of the pulse shaper 372 is applied via lead 184 to reset various circuits of FIG. 3. It is also applied through a delay means 374 to reset the digital-to-analog converter 130.

The jump to next line circuit 186 includes a digital-to-analog converter 376 followed by an amplifier stage 378. Each time the end of line sensing circuit produces an output, the digital-to-analog converter 376 increases its direct voltage level by one increment. This increment is sufficient to cause the amplifier 378 to shift the start of the horizontal scan to the beginning of the next line of characters. For example, in FIG. 9, the horizontal scan originally starts at line 376. As soon as the last character on the line on which the word "SEARCH" appears is read out, the jump to next line circuit increases its output voltage an amount sufficient to move the start of the next sweep to a line such as indicated by the dashed line 376*a* in FIG. 9. Thereafter, the search for the highest character in the next line begins.

It was mentioned previously that when the end of a document is reached, the paper transport mechanism removes the document being read and moves a new document into position. One circuit for producing the "end document pulse" is shown in FIG. 8. This circuit assumes a fixed document format, that is, a fixed number of lines on the page.

The circuit of FIG. 8 includes "and" gate 377. It receives the outputs of the various flip-flops in digital-to-analog converter 376 via cable 375. Some of these leads may be connected to 1 terminals and others to 0 terminals, the precise code used depending upon the number of lines on the page. After the last character on the last line is read, the various leads making up cable 375 all carry a one and "and" gate 377 is activated. The 1 output of the "and" gate is shaped by pulse shaper 379 and is applied via lead 381 to the paper transport mechanism. Lead 381 is also shown in FIG. 2 as an output lead from the search and centering circuit 16 and an input lead to the paper transport mechanism 10.

It is also possible to produce an end document pulse in a system in which the number of lines on the document is not fixed. The techniques for doing this may be similar to those already discussed in connection with the location of the last character on a line.

*Kinescope circuits*

Figure 10:
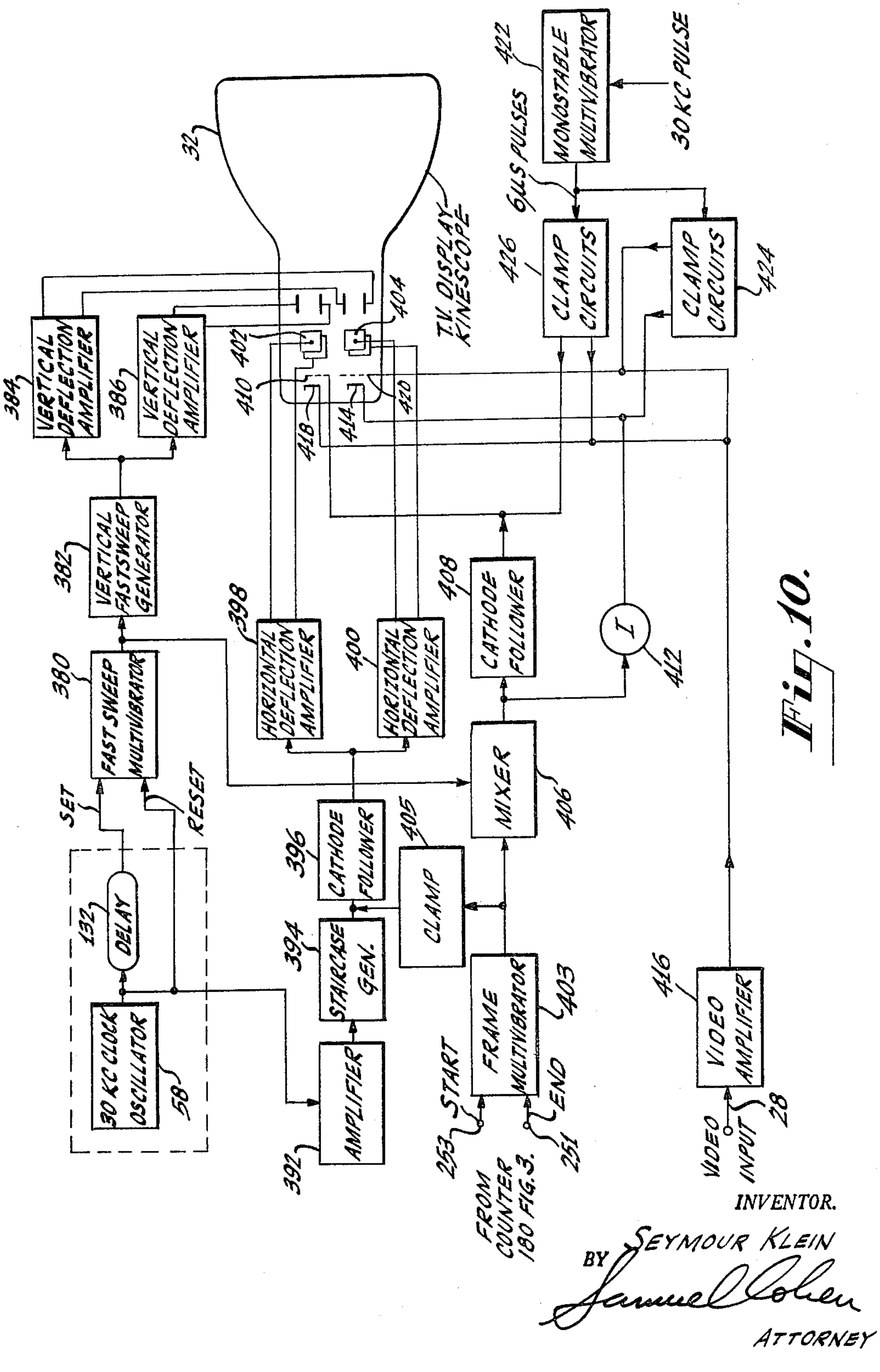
FIG. 10 is a block and schematic diagram of the deflection circuits for the kinescope of FIG. 2.

The kinescope circuits 30 of FIG. 2 are shown in more detail in FIG. 10. At the upper left left of the figure are the 30 kc. clock oscillator 58 and the delay line 132 of FIG. 3. The undelayed output of the clock oscillator is applied as a reset pulse to the fast sweep multivibrator 380. The same pulse delayed by delay means 132 is applied as a set pulse to the fast sweep multivibrator. The output of the multivibrator 380 is applied to the vertical fast sweep generator 382. The fast sweep output of the generator is applied to the vertical deflection amplifiers 384 and 386 for the vertical deflection plates 388 and 390 of the kinescope 32.

The undelayed clock pulses are also applied through amplifier 392 to staircase generator 394. The output of the generator is applied through cathode follower 396 to the horizontal deflection amplifiers 398 and 400. The deflection amplifiers are connected to the horizontal deflection plates 402 and 404 respectively of the kinescope.

The start pulse on lead 253 and the end pulse on lead 251 are applied to the frame multivibrator 402. These pulses come from the 1 through 32 counter stage of FIG. 3. The square wave output of the multivibrator 402 is applied to the clamp circuit 404 and to mixer 406. The mixer also receives the square wave output of fast sweep multivibrator 380. The mixer output is applied through cathode follower 408 to the control grid 410 for one beam of kinescope 32. The mixer output is applied also through inverter 412 to the cathode 414 which provides the other beam of the kinescope 32.

The video input for the kinescope appears at lead 28 (lower left). It is applied through a video amplifier 416 to the cathode 418 of one side of the kinescope and to the control grid 420 of the other side of the kinescope.

The 30 kc. pulses are applied also to a monostable multivibrator 422 shown at the lower right. The output of this multivibrator, which consists of 6 microsecond pulses, is applied through clamp circuits 424 to the cathode 414 and control grid 420 and through the clamp circuits 426 to the control grid 410 and cathode 418.

In the operation of the circuit of FIG. 10, the circuits for the vertical deflection plates are on continuously. Thus, the fast sweep multivibrator 380 always produces output square waves and the vertical deflection amplifiers 384 and 386 always apply the vertical sweeps of the television raster scan to the vertical deflection plates 388 and 390. The clamper circuits 426 apply square waves to the control grid 410 and cathode 418 synchronously with the application of the vertical sweeps to plates 388. The signal applied to the control grid 410 is positive and the signal applied to the cathode 418 is negative. These signals are at a level such that in the absence of a video signal applied to cathode 418 during the raster interval (the time between start and end pulses on leads 253 and 251, respectively) a bright raster is produced by the section 418, 410, 402, 388 of the kinescope. This raster corresponds to the negative image.

The clamper circuits 424 apply a negative signal to grid 420 and a positive signal to cathode 414. The voltage level applied by the clamper circuits 424 is such that in the absence of a video signal from amplifier 416 during the raster interval, the kinescope section 414, 420, 404, 390 is just below its threshold of visibility. This section of the kinescope generates a positive image.

When a start signal is received on lead 253 at the left of the figure, the frame multivibrator 402 is energized and it produces the leading edge of a square wave output. The square wave enables the cathode follower circuit 396 permitting the staircase generator 394 to apply deflection voltages to the horizontal deflection amplifiers 398 and 400. At the same time, the mixer circuit 406 produces enabling voltages for the control grid 410 of one section of the kinescope and for the cathode 414 of the other section of the kinescope. During this interval of the square wave output of frame multivibrator 402, video signals obtained during the raster scan of the flying spot scanner appear at input lead 28. These are applied to the cathode 418 and to the control grid 420. The signals are positive going and tend to drive the section 418, 410 of the kinescope in the cut-off direction and the section 414, 420 of the kinescope in the turn-on direction. Accordingly, a negative image is produced by the section 418, 410 of the kinescope and a positive image is produced by the section 414, 420 of the kinescope. These negative and positive images appear side-by-side as is shown, for example, in FIG. 7*a* of the RCA Engineer article referred to above. The side-by-side images in turn are applied to the optical tunnel which produces the multiple images shown in FIGS. 7*b* and 8*a* of the RCA Engineer article.

*Comparator and integrator*

Figure 11:
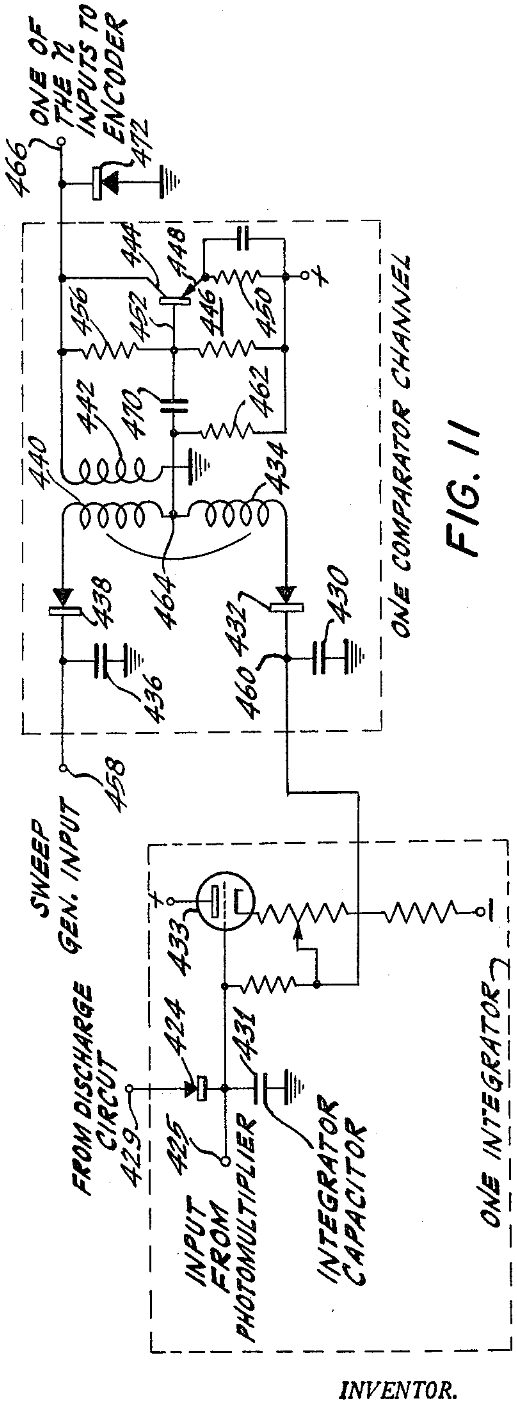
FIG. 11 is a schematic diagram of one integrator and comparator channel of FIG. 2.

The circuit of FIG. 2 includes *n* comparator channels 40. As the circuits for each channel are the same, only one of the channels and its integrator are shown in FIG. 11. The circuit includes an integrator capacitor 431 and cathode follower 433. The capacitor 431 stores a charge proportional to the output of one photomultiplier channel. The cathode follower 433 is connected through a diode 432 to a winding 434 of a transformer. The circuit also includes diode 438 which is connected to a second winding 440 of the transformer. A third winding 442 of the transformer is connected to the collector 444 of a transistor 446. Capacitors 436 and 430 are filtering capacitors.

The transistor 446 is arranged in a blocking oscillator circuit. The emitter 448 of the transistor is connected through resistor 450 to a source of positive voltage. The base 452 of the transistor is somewhat more negative than the emitter as it is connected to the voltage divider 454, 456. The regenerative circuit for the blocking oscillator includes the windings 434, 440 and 442 of the transformer.

In the operation of the circuit of FIG. 11, terminal 429 is normally at some negative value such as −19 volts. This terminal is connected to the output of a driver (not shown) which, in turn, receives the signal available on lead 182 (the 1 output of flip-flop 152, FIG. 3*a*). When the top edge of the character is found, flip-flop 152 (FIG. 3*a*) is set and a positive going signal appears on lead 182. This positive going signal is amplified by a driver (not shown) and applied as a 19 volt pulse to terminal 429. When the anode of diode 424 is made positive, the negative voltage normally on capacitor 431 discharges to ground. When the TV scans starts, the first pulse produced by the 1 through 32 counter 18 (FIG. 3*b* resets flip-flop 152 (FIG. 3*a*). This causes the voltage on lead 182 to go negative and terminal 429 returns to −19 volts. The integration circuit now integrates the signal applied to terminal 425 by the photomultiplier.

Input terminal 458 of FIG. 11 is initially at ground and input terminal 460 is at some negative value of voltage. It may be assumed that the input signal at 425 has been integrated and that input terminal 460 has the value of negative voltage closest to ground with respect to the inputs from all integrator channels. The negative voltage at terminal 460 causes some current to flow through the circuit which includes diode 432, transformer winding 434 and resistor 462. The latter is of relatively high value (over 2 megohms in one particular circuit) and the current flow through the transformer 434 is small. As there is little voltage drop through the diode 432 and winding 434, point 464 of the circuit is essentially at the same negative voltage as point 460. Accordingly, diode 438 is cut off (as terminal 458 is at ground) and no current flows through winding 440.

The transistor 446 conducts a slight amount of current in view of the fact that its base is slightly negative with respect to its emitter and slightly positive with respect to its collector. However, as the emitter 444 is connected to ground through winding 442, output terminal 466 is also at ground voltage.

After the character read-out has been compared with the characters on the mask all of the integrator channels are storing charges. A negative going sweep wave is then applied from circuit 42 (FIG. 2) to all of the comparator channels. The negative going sweep appears at input terminal 458 of FIG. 11. When the negative sweep voltage reaches a value slightly more negative than the voltage at terminal 460, diode 438 begins to conduct and current begins to pass through winding 440. At the same time, point 464 becomes slightly more negative than input terminal 460 cutting off diode 432. Thereupon current abruptly stops flowing through winding 434 and current abruptly increases through winding 440. The windings 434 and 440 are so wound with respect to one another that the start of current flow through the former is cumulative with stop of current flow through the latter and a negative pulse is applied through the capacitor 470 to the base 452. The effect of this is to produce a sudden increase in current flow through the transistor 446. This action is regenerative and continues until a charge develops across capacitor 470 of a polarity and amplitude to cut off transistor 446. The result is a short, large-amplitude, positive-going pulse at output lead 466. The diode 472 connected to the output lead 466 is for the purpose of preventing overshoot in the negative direction.

As already mentioned, there are *n* comparator channels. In normal operation, all of the comparator channels except one produce a binary "zero" output. The one channel produces a positive pulse indicative of the binary bit "one." These outputs are applied, in parallel, to the encoder 43 via the reject circuits 44 (see FIG. 2), which translates this information to a straight binary code and applies it to the memory. Alternatively, the output of the comparator channels can, if desired, be applied directly to the memory.

*Reject circuits*

Figure 12:
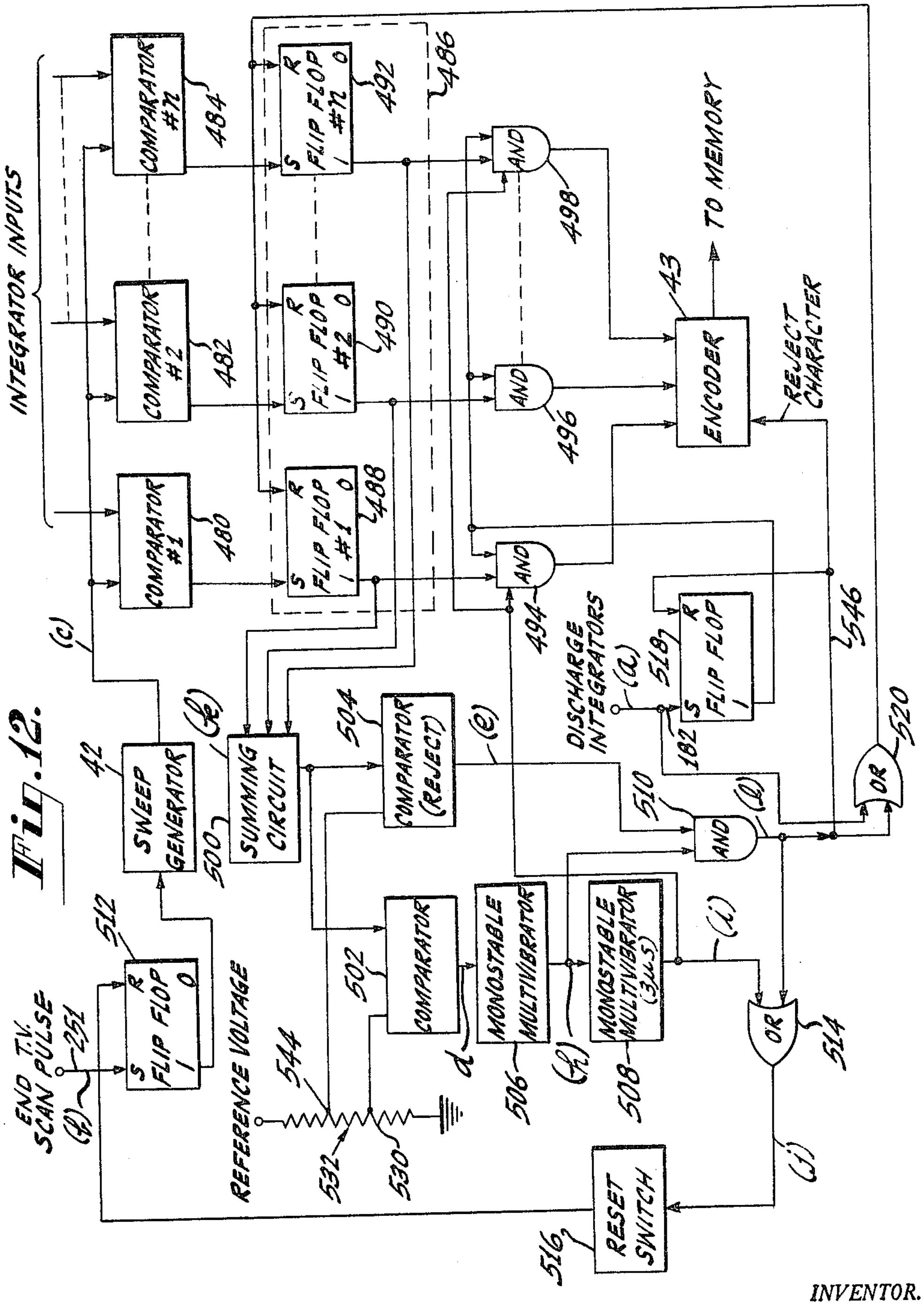
FIG. 12 is a block circuit diagram of the reject circuits and sweep circuits of FIG. 2.

A more detailed showing of the reject circuits 44 of FIG. 2 appears in FIG. 12. The purpose of these circuits is to reject the output of one comparator channel when a second comparator channel produces an output in too short a time interval after the first comparator. Put another way, the purpose of the reject circuits is to reject the output of a comparator channel when a second comparator channel stores a voltage which is very close to that stored by the first comparator.

The circuit of FIG. 12 shows three comparators 480, 482 and 484 of the *n* comparators in the system. Each of the comparators applies its output to a different flip-flop in the storage register 486. Three of the flip-flops, namely 488, 490 and 492 are shown. The "one" outputs of the flip-flops are applied to "and" gates, three of which 494, 496 and 498 are shown. The "one" outputs are applied also to a summing circuit 500.

The purpose of the summing circuit 500 is to produce an output proportional to the number of inputs it receives. The summing circuit may, for example, be a resistive summing network.

The summing circuit 500 applies its output to reject circuit comparators 502 and 504. The output of comparator 502 is applied to a monostable multivibrator 506 and the latter supplies its output to a monostable multivibrator 508 and an "and" gate 510. The second input to the "and" gate 510 is the output of the comparator 504.

The sweep generator 42 at the upper center of the figure is controlled by a flip-flop 512. The sweep starts when the flip-flop is set by the end TV scan pulse on lead 251 (see FIG. 3, lower right). The sweep stops when a reset pulse is applied to flip-flop 512. The reset pulse is applied via "or" gate 514 and reset switch 516. The latter is simply an amplifying and shaping circuit.

The "and" gates 494, 496 and 498 are controlled by a flip-flop 518. The latter is set by the discharge integrators pulse appearing on lead 182 (see FIG. 3, lower right). This pulse is also applied through "or" gate 520 to the reset terminals of register 486.

Figure 13:
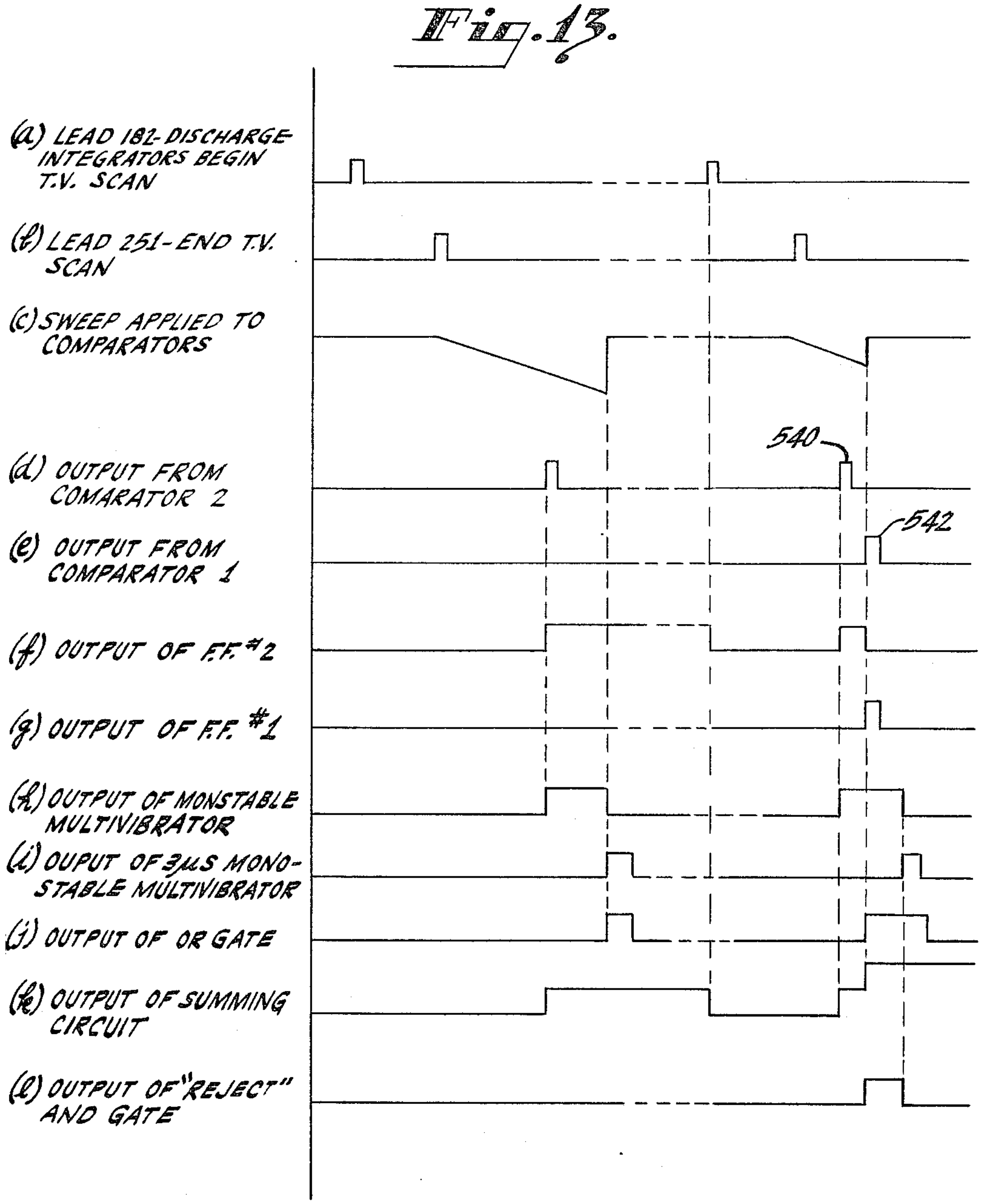
FIG. 13 is a drawing of waveforms to help explain the operation of the circuit of FIG. 12 and FIGS. 14 and 15 are equivalent circuits to help explain the operation of FIG. 4.

In the discussion of the operation of FIG. 12 which follows, FIG. 13 should also be referred to. The left half of FIG. 13 illustrates the circuit action when one of the comparators produces an output which is spaced from the output of a second comparator by greater than a predetermined interval of time. The right half of FIG. 13 illustrates the circuit action when two comparators produce outputs within a short time interval of one another.

Initially, flip-flop 518 is set and register 486 is reset. Inputs are applied to the various comparators from the various integrator channels. The TV raster scan is now over and the end TV scan pulse appears on input lead 251. This sets flip-flop 512 and starts sweep generator 42.

Assume now that comparator 482 is storing the voltage of lowest amplitude. When the sweep voltage is equal to the voltage stored by comparator 482, the latter produces an output which sets flip-flop 490. The high voltage appearing on the line 1 output terminal of flip-flop 490 is applied to "and" gate 496 and to summing circuit 500. The second input to "and" gate 496 is a high output of flip-flop 518. The third input to "and" gate 496 is, however, a low voltage indicative of the binary bit "zero."

The summing circuit 500 produces an output at a given level when it receives an input from flip-flop 490. This output is applied to comparators 502 and 504. The comparator 502 is similar to the comparator of FIG. 11. However, the second input to the comparator rather than being a sweep voltage is, instead, a fixed value of voltage obtained from connection 530 of voltage divider 532.

The output of the summing circuit is substantially equal to the voltage appearing at terminal 530 so that the comparator 502 produces an output at 534. This output is applied to monostable multivibrator 506 which produces a square wave of 5 or 6 microseconds duration. The lagging edge of the square wave triggers the monostable multivibrator 508 which produces a 3 microsecond output pulse. This output pulse is applied through "or" gate 514 and switch 516 to reset flip-flop 512 terminating the sweep produced by generator 42. The 3 microsecond pulse is also applied as the third input to "and" gate 496. Accordingly, this "and" gate produces a "one" output which is applied to the encoder 43. Prior to the next raster, a discharge integrator pulse appears at 182 which is applied through "or" gate 520 to reset the register 486 placing the circuit in condition to receive a new comparator output.

Assume now that comparator 482 produces an output which is followed closely by an output from comparator 480. The output of comparator 482 is shown at 540 in FIG. 13 and the output of comparator 480 is shown at 542 in FIG. 13. The spacing between these pulses is shorter than the duration of the square wave produced by monostable multivibrator 506.

In the operation of the circuit under the conditions assumed above, when flip-flop 490 becomes set, summing circuit 500 produces an output at one level. This causes the comparator 502 to produce an output and the monostable multivibrator 506 to produce an output. The output of the latter is a priming signal for "reject" "and" gate 510. During the interval that monostable multivibrator 506 is priming "and" gate 510, flip-flop 488 becomes set and applies an output to summing circuit 500. The summing circuit now produces an output at a higher level of amplitude. This serves as one input to comparator 504. The second input to comparator 504 is a fixed voltage obtained from terminal 544 of the voltage divider 542. This second voltage is substantially equal to the higher voltage output of the summing circuit. Accordingly, the comparator 504 now produces an output. This output enables primed "and" gate 510 which produces a "reject character" signal on lead 546. The output of "and" gate 510 is also applied through "or" gate 520 as a reset signal for the register 486. All of this occurs before any of the "and" gates 494–498 produce an output signal as the shift register 486 is reset before the generation of the 3 microsecond pulse by multivibrator 508. The pulse on the "reject character" lead 546 is used to encode a special character into the memory to signify a "reject" character.

In practice, the output of "and" gate 510 may also be applied to an alarm circuit to indicate that a character has been missed. Or, if desired, a blank space can be left for the character or a wrong character symbol printed to indicate that the character in question could not be read. In a practical machine it was found that fewer than one character in three million could not be read.

What is claimed is:

1. In a system for recognizing characters appearing on a page of printed material; means for locating the top edge of the highest character in the first line of print; means for locating the left edge of the first character in the first line of print; and means for locating the top edge of the said first character.

2. In a system for recognizing characters appearing on a page of printed material; means for locating the top edge of the highest character in the first line of print, means for locating the left edge of the first character in the first line of print; means for locating the top edge of said first character; and means, controlled by the means for locating the top and left edges of said first character, for producing a centered image of said first character.

3. In a system for recognizing characters appearing on a page of printed material; means for locating the top edge of the highest character in the first line of print; means responsive to the last-named means for locating the left edge of the first character in the first line of print; means responsive to the two means above for locating the top edge of said first character; and means responsive to the two means above, for scanning the characters to produce a centered image thereof.

4. In a system for recognizing characters appearing on a page of printed material, in combination, means producing a spot of light; means for projecting the light onto the page; means for scanning the spot of light across the page for locating the top edge of the first character in the first line of print; means for scanning the spot of light across the page perpendicularly to the initial scan in an area to the left of the first character and between an imaginary line which passes slightly above the top of the highest character in the first line and a second imaginary line which occurs slightly below the first character for locating the left edge of the first character in the first line of print; means for scanning the spot of light in a direction perpendicular to the last scan in an area above the first character and between an imaginary line which passes slightly to the left of the first character and a second imaginary line which passes slightly to the right of the first character for locating the top edge of the first character; and means for scanning the rectangular area within which the first character appears which is bounded on one side by an imaginary line slightly above the top edge of the first character and on another side by a line slightly to the left of the first character.

5. In a system for recognizing characters appearing on a page of printed material, in combination, means producing a spot of light; means for projecting the light onto the page; means for scanning the spot of light across the page for locating the top edge of the first character in the first line of print; means for scanning the spot of light across the page in a direction perpendicular to the initial scan in an area to the left of the first character and between an imaginary line which passes slightly above the top of the highest character in the first line and a second imaginary line which occurs slightly below the first character for locating the left edge of the first character in the first line of print; means for scanning the spot of light in a direction perpendicular to the last scan in an area above the first character and between an imaginary line which passes slightly to the left of the first character and a second imaginary line which passes slightly to the right of the first character for locating the top edge of the first character; and means for reproducing the image of the character which appears within a rectangle bounded on one side by an imaginary line slightly above the top edge of the first character and on another side by an imaginary line slightly to the left of the first character.

6. In a system for recognizing characters appearing on a page of printed material, in combination, means producing a spot of light; means for projecting the light onto the page; light sensing means for sensing the amount of light reflected from the page; means for scanning the spot of light across the width of the page in an area above the first line of print for locating the top edge of the first character in the first line of print; first storage means connected to the light sensing means for storing information as to the location of the top edge of said highest character in the first line of print and feeding said information back to said means for producing said spot of light; means for scanning the spot of light across the page in a direction perpendicular to the initial scan in an area to the left of the first character between an imaginary line determined by the first storage means which passes slightly above the top of the highest character in the first line and a second imaginary line which occurs slightly below the first character for locating the left edge of the first character in the first line of print; second storage means connected to the light sensing means for storing information as to the location of the left edge of the first character in the first line of print and for feeding said information back to said means for producing said spot of light; means for scanning the spot of light in a direction perpendicular to the last scan in an area above the first character between an imaginary line determined by the second storage means which passes to the left of the first character and a second imaginary line which passes slightly to the right of the first character for locating the top edge of the first character; third storage means conected to the light sensing means for storing information as to the top edge of the first character in the first line of print and feeding said information back to said means for producing said spot of light; and means responsive to all information fed back to said means for producing said spot of light for scanning the rectangular area within which the first character appears which is bounded on one side by an imaginary line slightly above the top edge of the first character and an another side of a line slightly to the left of the first character.

7. In a character recognition system, means for scanning a spot of light through an area on a page for locating a character; means for sensing light reflected from the page for producing an output signal when the spot of light passes through a character; means coupled to said sensing means for producing an output signal when the spot of light intersects a dark area on the page during more than a predetermined successive number, greater than one, of said scans; and means coupled to said sensing means for inhibiting said last-named means when the spot of light intersects a dark area on the page during fewer than said successive number of scans.

8. In a recognition system, means for scanning a page to obtain signals indicative of markings on the page, some of which represent intelligence and some of which may represent noise; and means for discriminating between the signals which represent intelligence and the signals which represent noise, comprising means for passing signals which recur during more than a predetermined number of successive scans of said page and for preventing the passage of signals which do not recur for more than said given number of successive scans of the page.

9. In a character recognition system, means for scanning a page to obtain signals indicative of markings on the page, some of which represent characters and some of which may represent noise; and means for discriminating between the signals which represent characters and the signals which represent noise, comprising a width-determining circuit for permitting the passage of signals indicative of markings of greater than a given width and preventing the passage of signals indicative of markings of smaller than said given width.

References Cited by the Examiner

UNITED STATES PATENTS

| | | | |
|---|---|---|---|
| 2,754,360 | 7/1956 | Dersch | 178—15 |
| 2,919,425 | 12/1959 | Ress | 340—149 |
| 2,933,246 | 4/1960 | Rabinow | 340—146.3 |
| 3,039,080 | 6/1962 | King | 340—146 |
| 3,050,711 | 8/1962 | Harmon | 340—146.3 |
| 3,160,855 | 12/1964 | Holt | 340—146.3 |
| 3,170,139 | 2/1965 | Rabinow | 340—146.3 |

OTHER REFERENCES

Alpha-Numeric Character Recognition Using Local Operations, by J. S. Bomba, 1959, Proc. of the Eastern Joint Computer Conference, pp. 218–224.

A System for the Automatic Recognition of Patterns, The Inst. of Elec. Engrs., by Grimsdale et al., Paper No. 2792M, December 1958, pp. 210–221.

Pattern Detection and Recognition, by S. H. Unger, Proc. of I.R.E., October 1959, pp. 1737–1751.

Reading by Electronics, Wireless World, April 1957, pp. 173–175.

MAYNARD R. WILBUR, *Primary Examiner.*

MALCOLM A. MORRISON, DARYL W. COOK, *Examiners.*

J. S. IANDIORIO, J. E. SMITH, *Assistant Examiners.*